US007117328B2

(12) United States Patent
Shibuya et al.

(10) Patent No.: US 7,117,328 B2
(45) Date of Patent: Oct. 3, 2006

(54) NON-VOLATILE DATA STORAGE SYSTEM AND DATA STORAGING METHOD

(75) Inventors: Hirofumi Shibuya, Tokyo (JP);
Takayuki Tamura, Higashiyamato (JP);
Hiroyuki Goto, Higashimurayama (JP);
Shigemasa Shiota, Tachikawa (JP);
Yasuhiro Nakamura, Tachikawa (JP)

(73) Assignee: Hitachi ULSI Systems Co., Ltd., Tokyo (JP)

( * ) Notice: Subject to any disclaimer, the term of this patent is extended or adjusted under 35 U.S.C. 154(b) by 118 days.

(21) Appl. No.: 10/937,258

(22) Filed: Sep. 10, 2004

(65) Prior Publication Data

US 2005/0033937 A1 Feb. 10, 2005

Related U.S. Application Data

(63) Continuation of application No. 10/080,576, filed on Feb. 25, 2002, now abandoned.

(30) Foreign Application Priority Data

May 22, 2001 (JP) .............................. 2001-152096

(51) Int. Cl.
*G06F 12/02* (2006.01)
*G06F 12/16* (2006.01)

(52) U.S. Cl. ........................ 711/162; 711/103; 711/156
(58) Field of Classification Search ..................... None
See application file for complete search history.

(56) References Cited

U.S. PATENT DOCUMENTS

| 4,135,240 | A | 1/1979 | Ritchie ....................... 711/164 |
|---|---|---|---|
| 5,392,433 | A | 2/1995 | Hammersley et al. ....... 710/200 |
| 5,844,910 | A | 12/1998 | Niijima et al. ............... 714/710 |
| 5,845,332 | A | 12/1998 | Inoue et al. ................. 711/163 |
| 5,860,083 | A | 1/1999 | Sukegawa .................... 711/103 |
| 5,956,473 | A | 9/1999 | Ma et al. ......................... 714/5 |
| 6,000,006 | A | 12/1999 | Bruce et al. ................. 711/103 |
| 6,219,768 | B1 | 4/2001 | Hirabayashi et al. ........ 711/154 |
| 6,230,233 | B1 | 5/2001 | Lofgren et al. .............. 711/103 |
| 6,237,110 | B1 | 5/2001 | Lin et al. ......................... 714/7 |
| 6,496,908 | B1 * | 12/2002 | Kamvysselis et al. ....... 711/162 |
| 6,813,683 | B1 * | 11/2004 | Tabuchi et al. .............. 711/112 |
| 2002/0093850 | A1 | 7/2002 | Hurich ................... 365/185.11 |

FOREIGN PATENT DOCUMENTS

| JP | 5-334506 | 12/1993 |
|---|---|---|
| JP | 6-52674 | 2/1994 |
| JP | 7-36759 | 2/1995 |

* cited by examiner

*Primary Examiner*—Gary Portka
(74) *Attorney, Agent, or Firm*—Miles & Stockbridge PC

(57) ABSTRACT

This invention realizes separate control for each memory area. A memory unit is structured by including a semiconductor memory device capable of memorizing information, the aforementioned memory device is divided into plural memory areas logically and also management table, which is capable of controlling separately each aforementioned memory area for accessing from the outside, is tabled, control information, which prohibits accessing the prescribed memory area of the aforementioned plural memory areas, is provided in the aforementioned management information, and it is prohibited to access the specified memory area from the outside in accordance with control information.

9 Claims, 21 Drawing Sheets

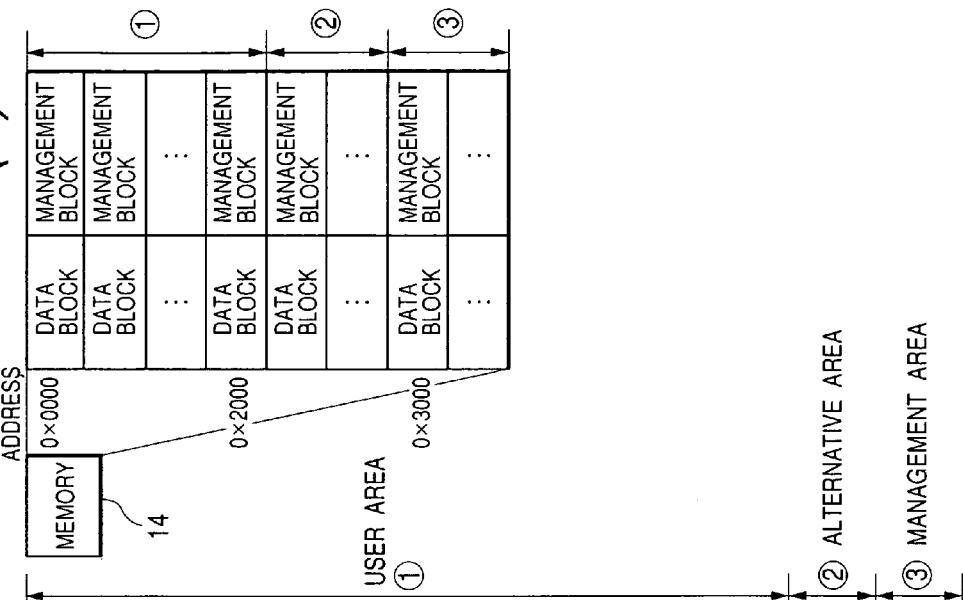
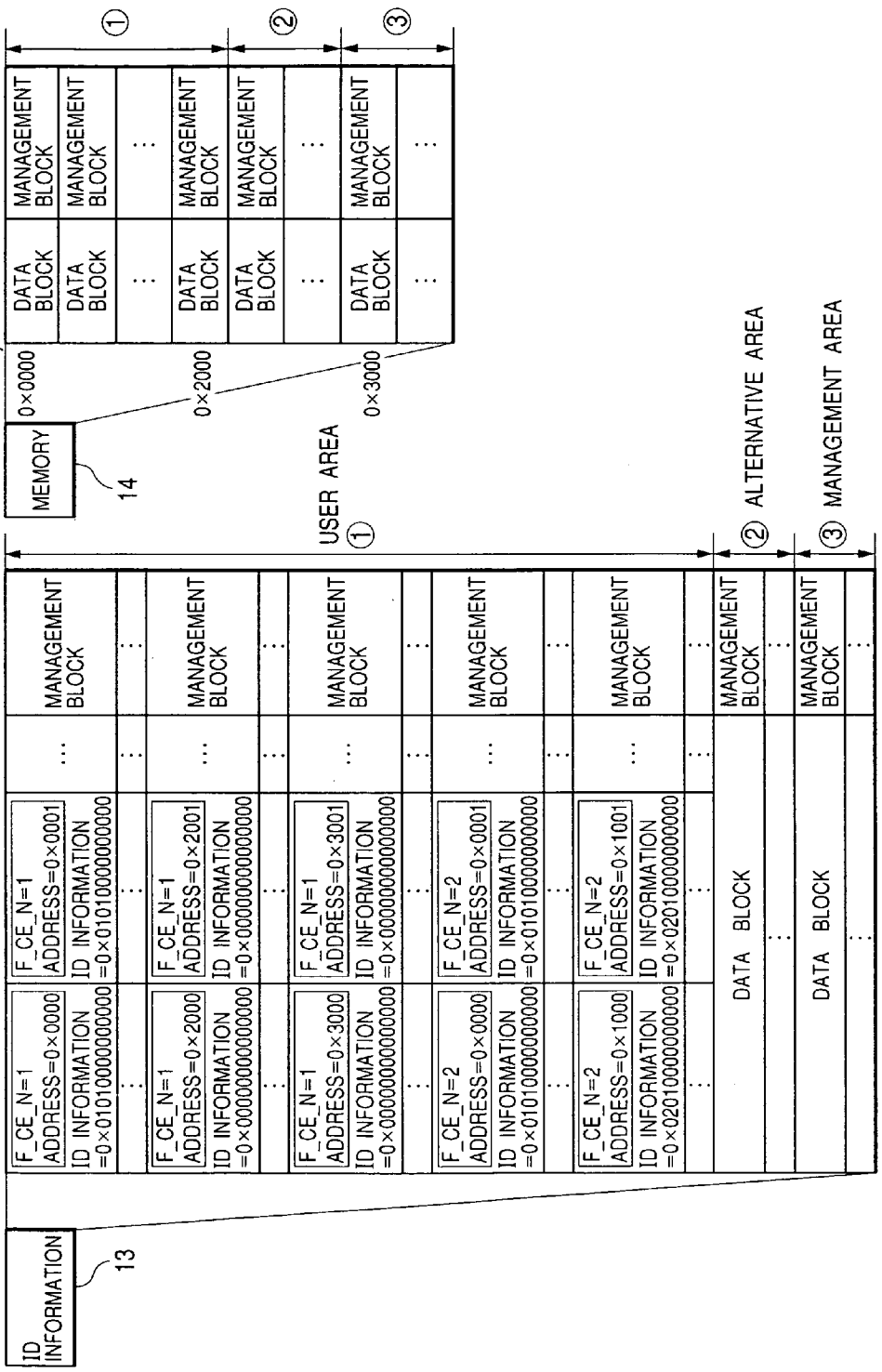

FIG. 4

| F_CE_N | ADDRESS (F_D) | ID INFORMATION | |
|---|---|---|---|
| 1 | 0×0000 | 0×01010000000000 | |
| ⋮ | ⋮ | ⋮ | |
| 1 | 0×1FFF | 0×01010000000000 | NORMAL READ/WRITE |
| 2 | 0×0000 | 0×01010000000000 | |
| ⋮ | ⋮ | ⋮ | |
| 2 | 0×0FFF | 0×01010000000000 | |
| 2 | 0×1000 | 0×02010000000000 | |
| ⋮ | ⋮ | ⋮ | READ ONLY |
| 2 | 0×1FFF | 0×02010000000000 | |
| 3 | 0×0000 | 0×04001000000000 | |
| ⋮ | ⋮ | ⋮ | MIRRORING (TIME DIFFERENCE) |
| 4 | 0×1FFF | 0×040021FFF00000 | |

GROUP 0 (rows 1–6), GROUP 1 (rows 7–9), GROUP 2 (rows 10–12)

NON-VOLATILE DATA STORAGE SYSTEM AND DATA STORAGING METHOD

CROSS-REFERENCE TO RELATED APPLICATIONS

This application is a continuation of application Ser. No. 10/080,576 filed Feb. 25, 2002.

BACKGROUND OF THE INVENTION

The present invention relates to a memory unit. More particularly, the present invention relates to control technology of the memory unit that employs a semiconductor memory unit. For example, the present invention relates to technology that is applied to a card type memory unit which is formed in a card shape and capable of attaching to a data processing system such as a PDA (Personal Digital Assistant).

In most cases, a hard disc device has been employed as an outer memory unit for a data processing device such as a computer system. In recent years, the outer memory unit, which utilizes a semiconductor memory unit, having large capacity has been employed instead of this hard disc device. A memory device of this type memory unit is structured by plural flash EEPROMs, for example. The memory unit utilizing flash EEPROM in this way can access data at high speed, compared with a hard disc device, and has superior characteristics in the points of reliability and anti-shocking. Such a memory device, is therefore developed as a memory board, a memory card, or a silicon disc device having the same interface as the hard disc, etc.

According to Japanese Patent Application Laid-Open No. Hei 7(1995)-36759, an IC card is disclosed, which includes a card controller for controlling the inside of a card and a microcomputer for controlling a card controller and file data, uses mask ROM and a flash memory for file data storing memory as a local memory and shares its mask ROM as an attribute storing memory. Further, it is aimed to improve the speed of writing a memory, grow longer the span of life, reduce the price, and improve the reliability by using PSRAM as a control table as a part of data management information (information for uniforming rewriting number of times by recording rewriting number of times), a write buffer for improving writing speed and a garbage buffer at the time of erasing unnecessary data.

Further, in accordance with Japanese Patent Application Laid-Open No. Hei 5(1993)-334506, the body system of the outside, in which an IC memory card 10 is equipped, accesses an attribute memory by controlling a mode control circuit 13. Then, there has been proposed an IC card, which controls an area that is required for performing a program and data by selecting one of memories to which data should be written by way of a higher level application program by identifying information of writing data, a reading out processing method, a memory type by each different memory capacity, and allocating addresses.

In accordance with Japanese Patent Application Laid-Open No. Hei 6(1994)-52674, flash EEPROM of the first mass storage unit is mounted on a printing circuit board, and flash EEPROM of the second mass storage unit is also mounted on the same printing circuit board. In this case, flash EEPROM of the second mass storage unit is mounted detachably by way of an IC socket. Thus, since it is possible to exchange flash EEPROM, in which management information is stored, by each chip unit, it is possible to maintain the mass storage subsystem.

SUMMARY OF THE INVENTION

When the present inventors examined the function of the conventional memory unit, the memory area has been managed as one memory area as the whole memory device. Since the memory area is not identified separately, it is found that each of areas cannot be controlled separately by dividing the memory device into several areas logically. To put it concretely, in the case in which there exist data that should not be rewritten or erased erroneously by a public user in the memory unit, it is convenient for protection if the data thereof can be protected just by being put in the prescribed areas as writing is prohibited. Since the conventional memory unit can not be separately controlled by each area in one memory unit, it is not possible to protect data existing in the areas by only the specified memory area being set as writing is prohibited. Further, in the case in which it is required to get log data of user's usage conditions, even if it is required to protect log data that are stored in the specified memory areas such that the data thereof should not read by the user, etc., it is very difficult to do so. Further, in the case in which the electrical power of the aforementioned memory unit is shut off at the time that data are written in the memory unit, it may take place that the data of the areas, in which data have been written, are erased. However, it is not possible to recover the data thereof by the memory unit.

Therefore, it is an object of the present invention to provide a non volatile data storage system and a data storing method which overcomes the above issues in the related art. This object is achieved by combinations described in the independent claims. The dependent claims define further advantageous and exemplary combinations of the present invention.

An object of the present invention is to provide technology for restricting accessing to the specified memory areas.

Another object of the present invention is to provide technology capable of protecting data that has existed in the areas thereof by setting only the specified memory area as writing being prohibited.

Still another object of the present invention is to provide technology capable of protecting data that has existed in the areas thereof by setting only the specified memory area as reading being prohibited.

Still another object of the present invention is to provide technology for recovering lost data.

The aforementioned objects and novel features are clarified with reference to attached figures and descriptions of the present specification.

The summary of the representatives of the present invention are explained in the following.

That is to say, the memory unit includes a memory device having at least one of a data unit and a semiconductor memory chip having a management unit corresponding to said data unit, in which the memory device is divided into plural memory areas, management information capable of controlling separately each of the memory areas for accessing from outside is tabled in the data unit. In addition, control information for setting a limit to accessing a prescribed memory area of the plural memory areas is included in management information.

In accordance with the aforementioned method, control information for setting a limit to accessing a prescribed memory area of the plural memory areas is included in management information, and it is limited to access the specified memory areas in accordance with this management information for accessing from the outside.

Further, a memory unit includes a memory device having at least one of a data unit and a semiconductor memory chip having a management unit corresponding to the data unit, in which the memory device is divided into plural memory areas, management information capable of controlling separately each of the memory area for accessing from outside is tabled in the data unit. In management information, there is included one of first control information for prohibiting writing data in a prescribed memory area of the plural memory areas, second control information for prohibiting reading out data from a prescribed memory area of the plural memory areas, third control information capable of performing simultaneously mirroring for storing data which are written in a prescribed memory area of the plural memory areas in plural places at a same time, and fourth control information capable of time difference mirroring for storing data which are written in a prescribed memory area of the plural memory areas in plural places after a prescribed time has passed.

In accordance with the aforementioned method, management information includes control information for setting a limit to accessing the prescribed memory areas of the aforementioned plural memory areas, and accessing is limited with respect to the specified memory areas in accordance with this control information for accessing from the outside. At this time, if first control information is included in management information, it is possible to prohibit writing data in the prescribed memory areas of the aforementioned memory areas based thereon. This function protects data existing in the aforementioned memory areas. If first control information is included in management information, it is possible to prohibit writing data in the prescribed memory areas of the aforementioned memory areas based thereon. This function protects data existing in the aforementioned memory areas. If second control information is included in management information, it is possible to prohibit reading out data in the prescribed memory areas of the aforementioned memory areas based thereon. This function protects data existing in the aforementioned memory areas. If third control information is included in management information, it is possible to store writing data for the prescribed memory areas of the aforementioned memory areas based thereon in plural positions nearly at the same time. Therefore, it comes to be possible to avoid losing data by utilizing data from other memory areas in the case in which uncorrectable data errors are caused. Further, if fourth control information is included in aforementioned management information, it is possible to store writing data for the prescribed memory areas of the aforementioned memory areas based thereon in plural positions after a predetermined time difference has passed. Therefore, it comes to be possible to avoid losing data by utilizing data from other memory areas in the case in which uncorrectable data errors are caused.

The aforementioned management information includes fifth control information for identifying whether or not a memory area which has been kept as a spare area in advance is capable of being used. If fifth control information is included in the aforementioned management information, the spare areas can be used based thereon. Therefore, when the use of the specified memory areas is impossible, memory capacity is prevented from reducing by alternating for the spare areas.

If aforementioned management information includes sixth control information for indicating erasing number of times or rewriting number of times of a memory area, it is possible to know the span of life of the memory area based thereon. Therefore, the reliability of data that are stored in the aforementioned memory area is improved.

At this time, a memory means for storing all management information can be included. Further, in the aforementioned plural memory areas, an area for storing aforementioned management information by each memory area is provided and management information can be stored therein.

Control means for controlling separately the memory area based on management information can be included. At this time, the control means includes a micro processing unit for processing management information by software.

Further, it is possible to structure the aforementioned control means by including a controlling unit for processing management information by exclusive hardware.

It is possible to structure a data processing system by including the aforementioned memory unit and a host device capable of accessing the memory unit.

When a data processing device is structured by including a memory unit and a host device capable of accessing it, the host device can include an information processing unit for controlling separately the aforementioned memory area based on aforementioned management information.

When the memory device, which includes a semiconductor memory device capable of rewriting memory information, is controlled, there is included a step for controlling separately the memory device by each memory area based on management information which includes, when the memory device is divided into plural memory areas logically, at least one of first control information for prohibiting writing data in a prescribed memory area of the plural memory areas, second control information for prohibiting reading out data from a prescribed memory area of the plural memory areas, third control information capable of simultaneously mirroring for storing data that are written in a prescribed memory area of the plural memory areas in plural places nearly at the same time, and fourth control information capable of time difference mirroring for storing data that are written in a prescribed memory area of the plural memory areas in plural places after a prescribed time has passed.

The aforementioned management information includes fifth control information for identifying whether or not a memory area is usable, or sixth control information for indicating erasing number of times and rewriting number of times of a memory area.

When the management information edit step capable of editing aforementioned management information is included, this management information edit step includes a first step identifying whether or not the step of editing management information transits to an edit mode of the management information and a second step for editing management information in an edit mode which is transited based on an identifying result at the first step. Then, the aforementioned second step includes the third step for identifying whether or not a command given from a host device is a writing command to a random access memory from the host device and for writing aforementioned management information in the aforementioned random access memory from the aforementioned host device based on an identified result thereof, a fourth step for identifying whether or not a command given from the aforementioned host device is a command for writing a memory device from the aforementioned random access memory and writing aforementioned management information in the aforementioned memory device from the aforementioned random access memory, the fifth step for identifying whether or not a command given from the aforementioned host device is a command for reading out from the aforementioned memory device to the aforementioned random access memory and reading out aforementioned management information to the random access memory from the aforementioned memory device, and the sixth step for identifying whether or not a command given from the aforementioned host device is a command for reading out the aforementioned host unit from the aforementioned random access memory and reading out management information to the aforementioned host device from the aforementioned random access memory.

For editing the aforementioned management information, it is possible to prevent management information from being rewritten by a user unintentionally, by enabling editing only at the management information editing step which is realized by giving a prescribed command. Further, the step transits to the management information editing step by giving a prescribed command, and management information can be edited. Therefore, according to the application fields of the memory devices, the contents of individual control by each area can be easily changed.

BRIEF DESCRIPTION OF THE DRAWINGS

FIGS. 3A and 3B are explanatory views of other memories and the ID information storing memory included in the aforementioned memory unit.

FIG. 4 is an example of the table of the aforementioned ID information storing memory.

DETAILED DESCRIPTION OF THE PREFERRED EMBODIMENTS

The invention will now be described based on the preferred embodiments, which do not intend to limit the scope of the present invention, but exemplify the invention. All of the features and the combinations thereof described in the embodiments are not necessarily essential to the invention.

Figure 1:
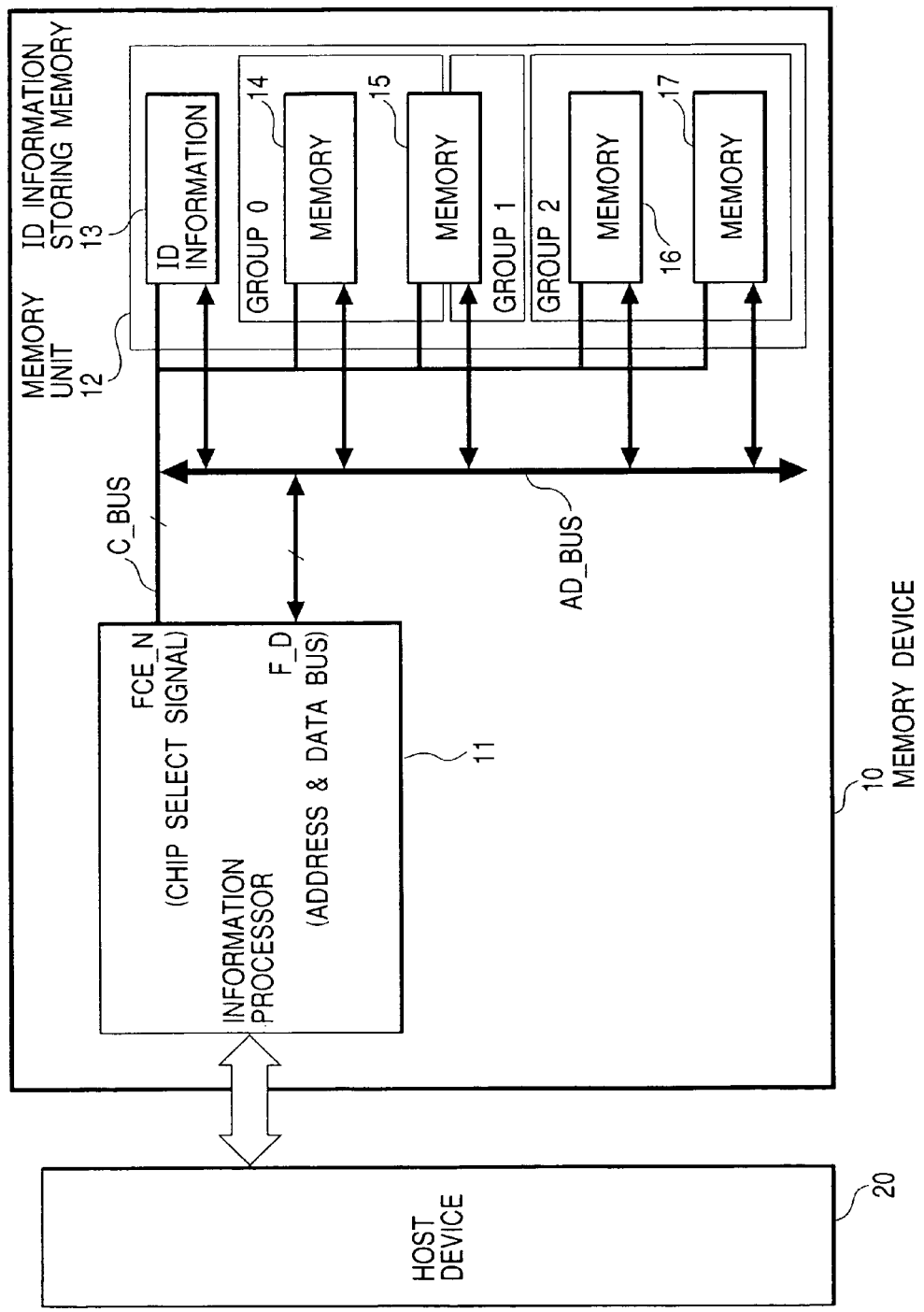
FIG. 1 is an example of the block structure of a memory unit of the present invention.

FIG. 1 is an example of the structure of a memory unit of the present invention.

A memory unit 10 is applied, though it is not limited, as an outer memory unit of a host device 20 such as a portable personal computer system as an example of a data processing device, and access by the host device 20 can be realized.

The memory unit 10, though it is not limited, is formed in the shape of a card including an information processor 11 and a memory device 12, and connected to the aforementioned host device 20 in a detachable way.

The memory device 12 includes an ID information storing memory 13 which is formed on one semiconductor substrate such as a single crystal silicon substrate and other memories 14 to 17 for storing files by way of the conventional semiconductor integrated circuit manufacturing technology, though it is not limited. The ID information storing memory 13 and other memories 14 to 17, though they are not limited, are treated as flash memories including nonvolatile memory devices, and it comes to be possible to rewrite stored information thereof electrically. The ID information storing memory 13, the other memories 14 to 17 and the information processor 11 are connected by way of an address and data bus AD_BUS capable of accessing address signal and data, a chip select signal for selecting a chip and a control bus C_BUS for transmitting various control signals in relation to a read write control.

The memory device 12 is divided into 3 groups (memory areas) 0, 1 and 2 logically, though it is not limited. The group 0 is formed by a part of the memories 14 and 15. The group 1 is formed by a part of the memory 15. The group 2 is formed by memories 16 and 17.

The information processor 11 is connected to a host device 20, and it comes to be possible to access various types of information in relation to the memory unit 10 between this host device 20 and the information processor 11. Further, the information processor 11 can operate and control the memory device 12 by way of the address and data bus AD_BUS and the control bus C_BUS. For this operation control, ID information which is stored in the ID information storing memory 13 is referenced, and then it comes to be possible to operate individually for every group based on this ID information. Here, the aforementioned ID information is treated as an example of management information of the present invention.

Figure 2:
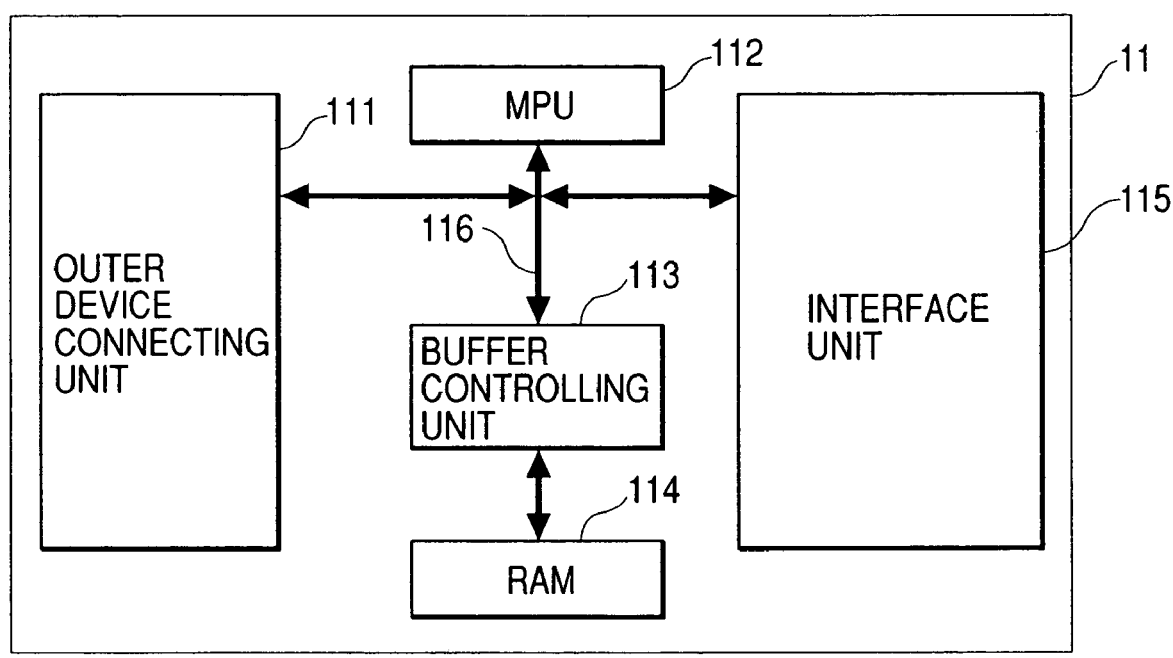
FIG. 2 is an example of the block structure of the information processing unit included in the aforementioned memory unit.

FIG. 2 is an example of the structure of the information processor 11.

As shown in FIG. 2, this information processor 11, though it is not limited, includes an outer device connecting unit 111, MPU (Micro Processing Unit) 112, a buffer controller 113, RAM (Random Access Memory) 114, and an interface unit 115. An outer device connecting unit 111 functions as an interface which enables it to exchange information between the host device 20 and the outer device connecting unit 111.

The interface unit 115 functions as an interface which enables it to exchange information between the memory device 12 and the interface unit 115. Further, the interface unit 115 includes an error detecting circuit for detecting an error of data which are used here and an error correction circuit for correcting an error based on the results of detection by this error detection circuit and thus it comes to be possible to improve the reliability of data.

MPU 112 is the core logically of an information processing unit, and then MPU 112 performs, in accordance with a predetermined program, a predetermined operating process for processing information including controlling the operation of the memory device 12. This MPU 112 is connected to the outer device connecting unit 111, the buffer controller 113 and the interface unit 115 by way of an MPU bus 116, and then MPU 112 controls the operation of each unit thereof by way of this MPU bus 116.

RAM 114 is defined as a memory (random access memory) which is randomly accessed by the aforementioned MPU 112 through the buffer controller 113. This RAM 114 is used for temporarily storing data which are exchanged between the host device 20 and the memory device 12. Further, RAM 114 is also used as a work area in an operation process of the aforementioned MPU 112.

FIG. 3 indicates an internal structure of the memory 14 and an internal structure of the ID information storing memory 13.

The memories 14 to 17 are defined as having the same structures respectively, therefore the memory 14 only is explained in detail.

The memory 14 as shown in FIG. 3B is divided, though it is not limited, into respective data blocks and management blocks corresponding thereto in the row direction. The data block can store data. A management block manages the aforementioned data by each 1 block unit or 1 sector unit in order to save a redundancy of the data block. If there is a defective part in the data block, 1 block or 1 sector which contains the defective part thereof is redundancy-saved by changing to a normal block or a normal sector in accordance with redundancy save information which is managed by the management block. The ID information storing memory 13 is structured by a flash memory and change of information of save information can be realized, and thus it comes to be possible to save the redundancy of the data block for the defective part which is caused after the proper time.

Further, the memory 14 is divided into a user area ①, an alternative area ②, and a managing area ③. The user area ① is defined as an area which a user can use. The alternative area ② is defined as an area capable of changing a part, which cannot be used by the user area ①, by each block unit or sector unit. The managing area ③ is defined as an area for managing, by each block unit and sector unit, information to identify whether or not changing has been made through the changing area and information of a changing point at the time of being changed. At the time of accessing the memory 14, information which is managed in the managing area ③ is checked, and the alternative area is accessed instead of the normal area, if the normal area is alternated.

As shown in FIG. 3A, a table is formed in the ID information storing memory 13 by storing ID information of the aforementioned memories 14 to 17 in an address order. Though it is not limited, it is divided into a data block and a management block. The data block can store the data. The management block manages the aforementioned data by each 1 block unit or 1 sector unit in order to save the redundancy of the aforementioned data block. If there is a defective part in the data block, 1 block or 1 sector containing the defective part thereof is redundancy-saved by alternating a normal block or a normal sector in accordance with redundancy save information which is managed by the management block. Since the ID information storing memory 13 is structured by a flash memory and information of save information can be changed, it comes to be possible to save the redundancy of the data block to the defective part that is caused later.

Further, the ID information storing memory 13 is divided into the user area ①, the alternative area ②, and the managing area ③ in the column direction. The user area ① is defined as an area which can be used by a user. The alternative area ② is defined as an area which can alternate the part which could not be used in the user area ① by each block unit or sector unit. The managing area ③ is defined as an area for managing, by each block unit and sector unit, information to identify whether or not changing has been made through the changing area and information of a changing point at the time of being changed. When the memory 14 is accessed, information which has been managed in the managing area ③ is checked, and the alternative area therefor is accessed instead of the normal area when the alternative area has been alternated. In this example, as described in an earlier part of the specification, the data block and the management block corresponding thereto are provided. The aforementioned data block is managed by each 1 block unit or 1 sector unit in order to save the redundancy of the data block. On the other hand, the table of ID information, which enables to control each predetermined memory area separately beforehand, is formed in the data block.

At this stage, the aforementioned ID information extends not only to the user area ① but also to the alternative area ② and the managing area ③. That is to say, in FIG. 3B, though the alternative area ② of the memory 14 is defined as an area from address "0X2000" to the presence of "0X3000" and the managing area ③ is defined as an area after the address "0x3000," ID information in relation to this area is also contained in ID information indicated in FIG. 3A. This is for omitting restructure of all the tables of ID information, by allocating ID information in advance even if the size of the user area ①, the alternative area ② and the managing area ③ of the memory 14 is changed. The alternative area ② and the managing area ③ are areas for managing memories. It is not appropriate to have ID information in the area thereof, thus all logical value of ID information is fixed to "0" as long as corresponding alternative area ② and managing area ③ are not used as user areas, for ID information which is stored in the alternative area ② and the managing area ③, in the memory 14.

At this point, in FIGS. 3A and 3B, ID information in relation to the memory 14 is indicated. Further, for other memories 15 to 16, in the same way as the memory 14, ID information in relation thereto is defined.

The memory device 12 is accessed by the host device 20. In the ID information storing memory 13 and the other memories 14 to 15 for storing files, there are included the data blocks and the management blocks therefor. In the case in which the data block is saved by each sector unit, in accordance with information of the management block, the defective part of the data block is alternated by each sector unit. Further, in this example, in the case in which the memories 14 to 17 are accessed, in accordance with ID information which has been tabled in the table part of the ID information storing memory 13, the memory areas which have been set in advance are separately controlled.

FIG. 4 is an example of the table of the ID information storing memory 13.

As shown in FIG. 4, each chip enable signal F_CE_N, each address (FD) and each ID information are included in a table which has been formed in this ID information storing memory 13.

The chip enable signal F_CE_N has 4 types, and each F_CE_N corresponds to respective memories 14, 15, 16 and 17. Though there is no limitation, the memory 14 is designated by F_CE_N=1, the memory 15 is designated by F_CE_N=2, the memory 15 is designated by F_CE_N=3, and the memory 16 is designated by F_CE_N=4. Further, the address (FD) is each address for each of memories 14, 15, 16 and 17, and each address (FD) is defined within the range from 0X0000 to 0X1FFF. In accordance with this address (FD), ID information having the byte structure is allocated. In accordance with this situation, The group 0 is defined as the memory 14 which is designated by F_CE_N=1 and addresses "0X1000" to "0X1FFF" of the memory 15 which is designated by F_CE_N=2. The group 1 is defined as addresses "0X1000" to "0X1FFF" of the memory 15 which is designated by F_CE_N=2. The group 2 is defined as addresses "0X0000" of the memory 16 which is designated by F_CE_N=3 to "0X1FFF" of the memory 17 which is designated by F_CE_N=4.

Though it is described later, in accordance with aforementioned ID information, the contents of controlling normal read/write, read-only and mirroring are specified, thus it comes to be possible to control accessing from the outside by each aforementioned memory area. In the example of FIG. 4, read/write can be performed to the group 0. For the group 1, write-in is prohibited by designating read-only. For the group 2, the same data as the contents of the memory of the groups 0 and 1 are written in after the prescribed time has passed by designating mirroring (time difference) for the groups 0 and 1.

Figure 5:
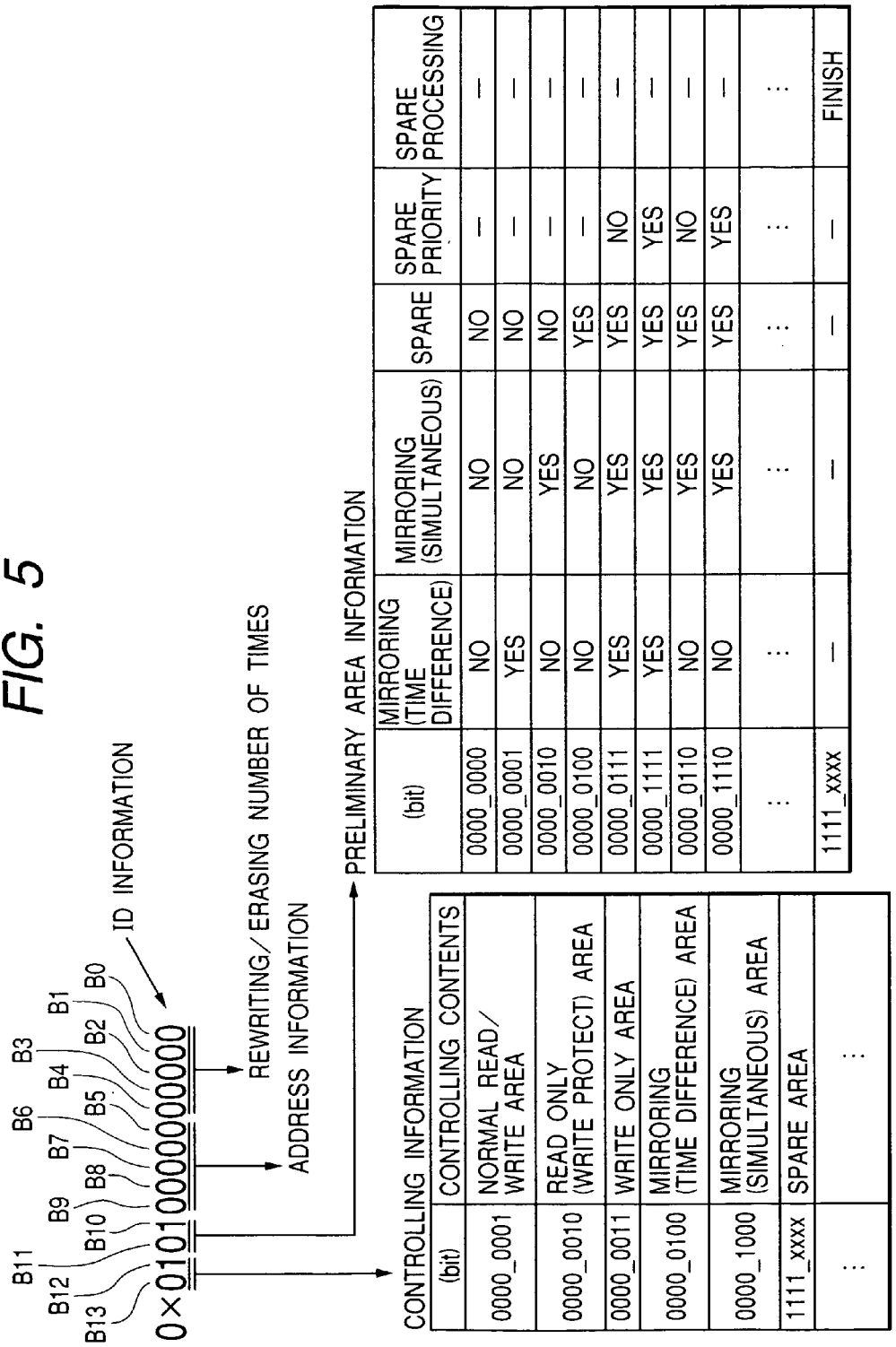
FIG. 5 exemplifies the structures of ID information that is managed in the aforementioned memory unit.

FIG. 5 exemplifies the structures of ID information.

At this time, ID information is defined by a byte format. If ID information is defined toward the left end from the right end of ID information in the manner of being bytes B0, B1, B2 and B3, bytes B0 to B4 designate the rewriting/erasing number of times of the area which is specified by aforementioned ID information, bytes B5 to B9 designate address information, bytes B10 to B11 designates preliminary area information, bytes B12 and B13 designate control information.

Aforementioned preliminary information includes information of identifying whether or not mirroring ("time difference mirroring" is used hereinafter) having a prescribed time difference should be performed to the area specified by aforementioned ID information, information of identifying whether or not mirroring ("simultaneously mirroring" is used hereinafter) is performed at the same time to the area specified by aforementioned information, information of identifying whether or not a spare area exists, information of identifying whether or not processing ("spare process" is used hereinafter) for allocating a spare area is performed in a priority manner in the case in which an uncorrectable error is caused in the case in which there exists a spare area and information of identifying whether or not the spare process has been terminated. Mirroring means that the same data as the data which have been written in the specified area are written in a different area. At this time, simultaneously mirroring and time difference mirroring are identified according to the difference of timing of writing the data. Further, the spare is a alternative area of the specified area. In the case in which bytes B10 and B11 are expressed by the bit format, the contents of preliminary area information is specified by the logical values of the specified bits. Though it is not limited especially, in the case of "0000_0000," time difference mirroring and simultaneously mirroring are not performed and further the spare area does not exist in addition. In the case of "0000_0001," time difference mirroring is designated. In the case of "0000_0010," simultaneously mirroring is designated. In the case of "0000_0100," it is designated that there exists the spare area. In the case of "0000_0111," it is designated that time difference mirroring and simultaneously mirroring are performed and further there exists the spare area. In the case of "0000_1111," it is designated that time difference mirroring and simultaneously mirroring are performed and further there exists the spare area, in which it is designated that the spare process is performed in a priority manner at the time that the uncorrectable error is caused. Further, in the case of "1111_XXXXX" (X defines a logical indefinite value), it is designated that the spare process has been terminated.

Further, for aforementioned control information, in the case in which bytes B12 and B13 are expressed by the bit format, the contents of preliminary area information are specified by way of the logical values of prescribed bits. Though it is not limited especially, it is designated that "0000_0001" is a normal read/write area. It is designated that "0000_0010" is a read only (write protect) area. It is designated that "0000_0011" is write only area. It is designated that "0000_0100" is a time difference mirroring area. It is designated that "0000_1000" is the simultaneous mirroring area. It is designated that "1111_XXXX" is the spare area. At this time, "XXXX" means the logical indefinite values.

Writing data onto the read only area is prohibited. Further, reading out of data from the write only area is prohibited.

The operation of the memory unit 10 is explained with reference to FIGS. 6 to 13.

Figure 6:
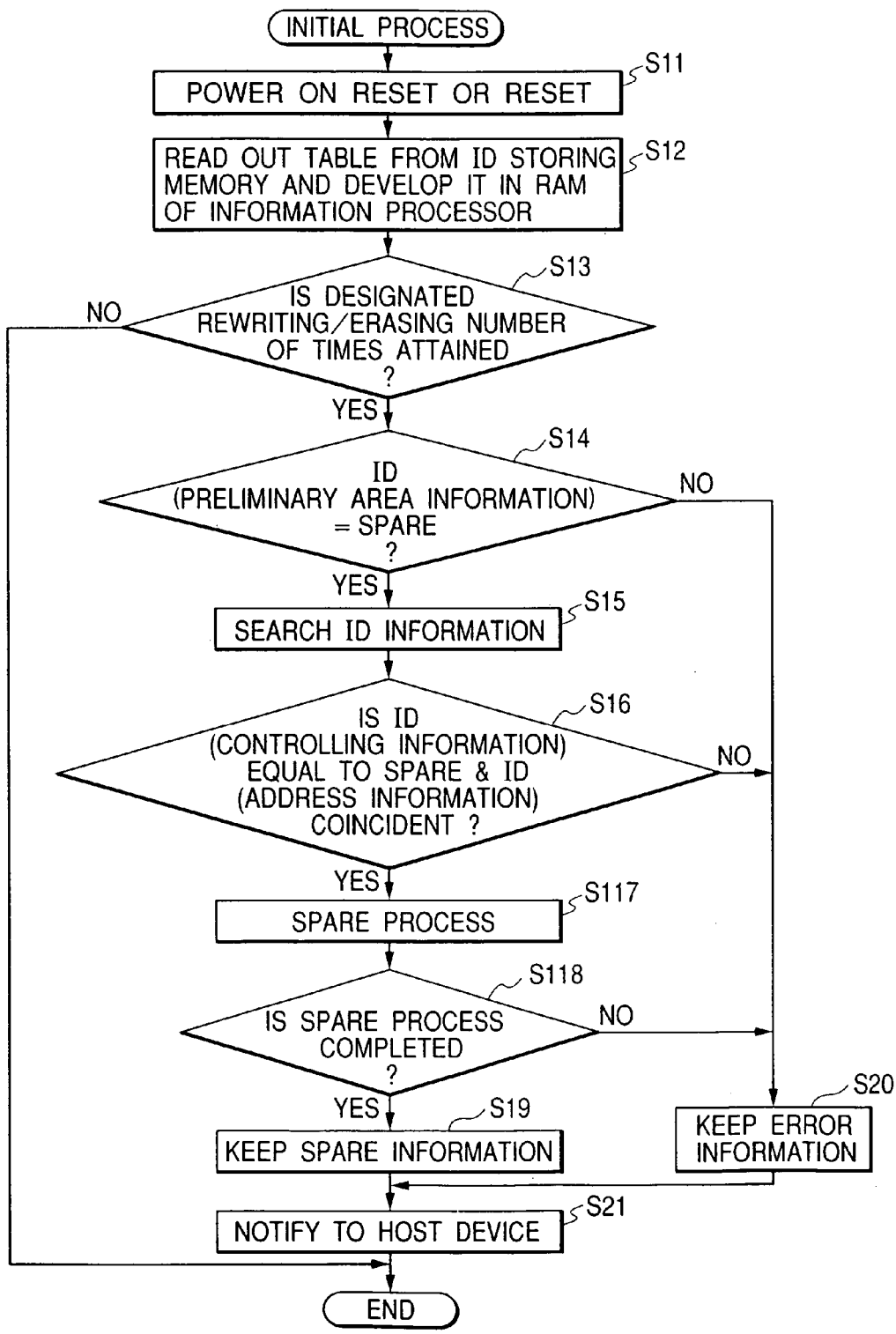
FIG. 6 is a flowchart of an initial process of ID information.

FIG. 6 is a flowchart of an initial process of ID information.

The memory unit 10 is firstly initialized by way of a power on reset or a normal reset by supplying the power (S11).

Next, the table of ID information is developed from the ID information storing memory 13 in RAM 114 of the information processor 11 (S12). Further, the information processor 11 determines whether or not the memory device 12 attains the prescribed erasing number of times or the prescribed rewriting number of times with reference to the table which is developed in RAM 114 (S13). In this determination, in the case in which it is decided that the prescribed rewriting number of times or the erasing number of times has not been attained (No), the present initial process is terminated. However, for judging at the step of S13, in the case in which it is judged that the prescribed rewriting number of times or the prescribed erasing number of times has been attained (Yes), since the reliability of stored information is improved by alternating for the spare area, it is judged whether or not the spare exists with reference to preliminary area information of ID information at the first place (S14). When it is judged that the spare has existed (Yes), in order to search the spare, control information of ID information indicates the spare area and further it is started to search ID information having the same address information (S15). At this stage, the meaning that address information agrees is used for judging whether or not the address and a chip enable signal (F_CE_N) of the source of the spare agree with address information of ID information of the destination of the spare. For this search, control information indicates spare area, and then judgement whether or not address information of ID information agrees is performed (S16). In this judgement, in the case in which control information indicates the spare area and it is judged that address information of ID information agrees (Yes), since it is ID information of the spare, thus the information processor 11 performs the spare process (S17). This spare process writes the data of the source of the spare in the destination of the spare by saving once in RAM 114, etc. Further, a write error procedure, in which rewrite in the alternative area can be realized, is included in this spare process. That is to say, in the case in which it has not been possible for the spare process to write normally the data in the spare area, rewrite in the area thereof is performed. Further, judgement whether or not the spare process has been terminated is performed (S18). In the case in which it has been judged that the spare process has been terminated (Yes), spare information is kept (S19), and then the host device 20 is notified. Further, for judging at the step of S14, in the case in which the spare does not exist (No) and in the case in which the spare has not been searched at the time of judging at the step of S16, and further in the case in which it has been judged that the spare process has not been terminated (No) due to any situation, error information is kept up (S20), and then the initial process is terminated by notifying error information to the host device 20 (S21)

Figure 7:
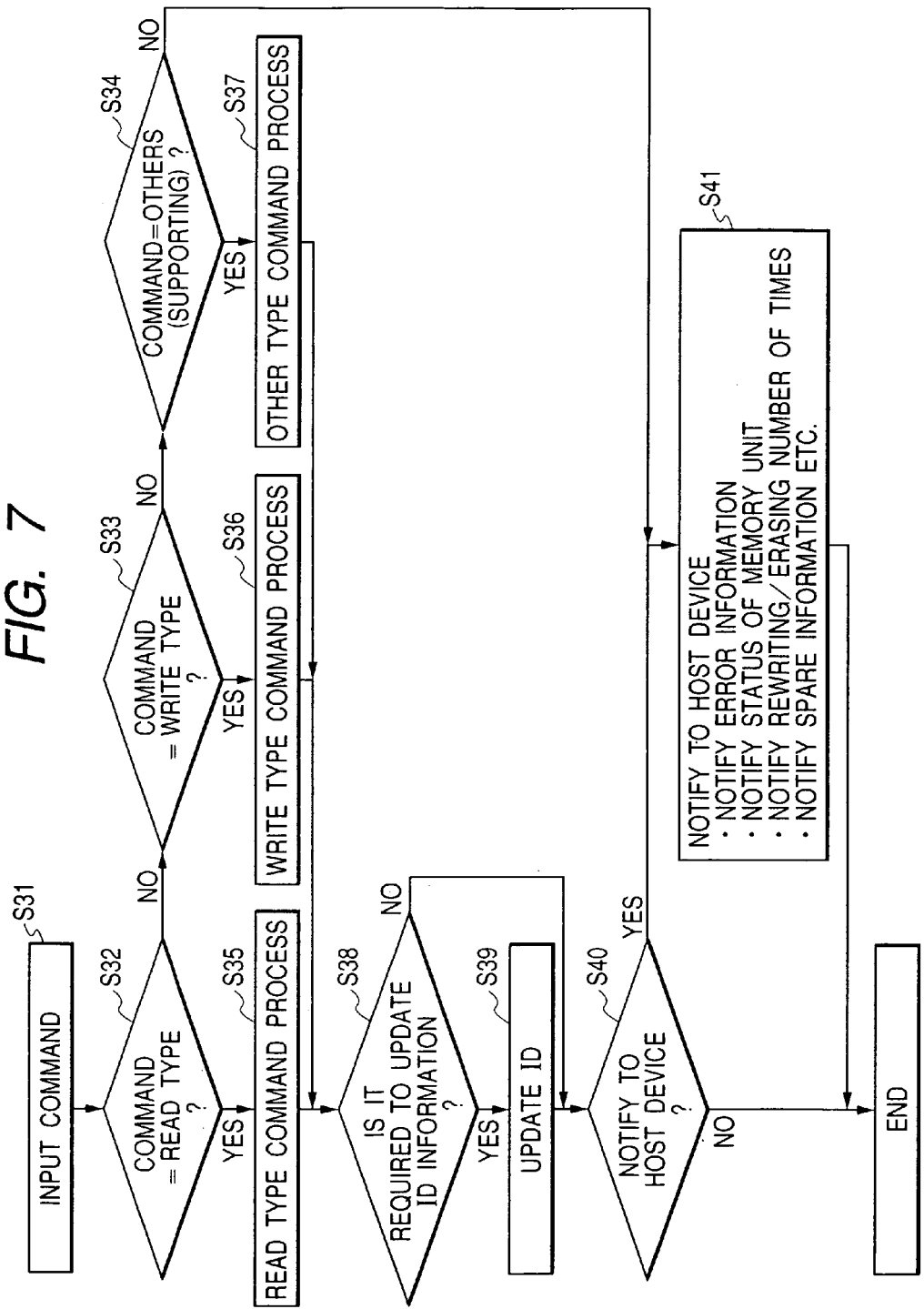
FIG. 7 is a flowchart of a normal process of ID information.

FIG. 7 is a flowchart of a normal process of ID information.

For normal processing of ID information, if a command is given from the host device 20 (S31), whether or not the command thereof is a read type is judged (S32). If it is judged that the command thereof is the read type (Yes), the read type command process, which is described hereinafter, is performed (S35). At the step S32, if it is judged that the command thereof is not the read type (No), whether or not the given command is a write type or not is judged (S33). If it is judged that the command thereof is the write type (Yes), the write type command process, which is described hereinafter, is performed (S36). At the step S33, if it is judged that the command thereof is not the write type (No), whether or not the given command is a command other than the read or write type is judged (S34). In this judgement, if it is judged that the command thereof is the command which has already been supported (Yes), other type command process, which is different from the aforementioned read or write type command process, is performed (S37). The other command process is also described hereinafter. At the step S34, if it is judged that the command thereof is not an unsupported command (No), since the command which has been processed at the step of S31 is the unsupported command of the information processor 11, the situation therefor is informed to the host device 20 (S41).

As a result of the read command process at the step of S35, write type command process S36 at the step of S36 or other command process at the step of S37, it might be needed to update ID information in such a way that the rewriting/erasing number of times of the memory device 12 is changed or spare information is changed, for example. Therefore, after the read command process at the step of S35, write type command process S36 at the step of S36 or other command process at the step of S37 is terminated, whether or not ID information should be updated is judged (S38). In the case in which the memory device 12 is rewritten by the write type command process, for example, update of ID information is required. In the case in which it is judged at the step of S38 that update of ID information is required (Yes), update of ID information (S39) is performed and thereafter the present procedure will be terminated after the host device 20 is notified (S41). The host device 20 is notified by way of error information, the status of the memory device 12, the rewriting/erasing number of times of the memory device 12 and spare information.

Figure 8:
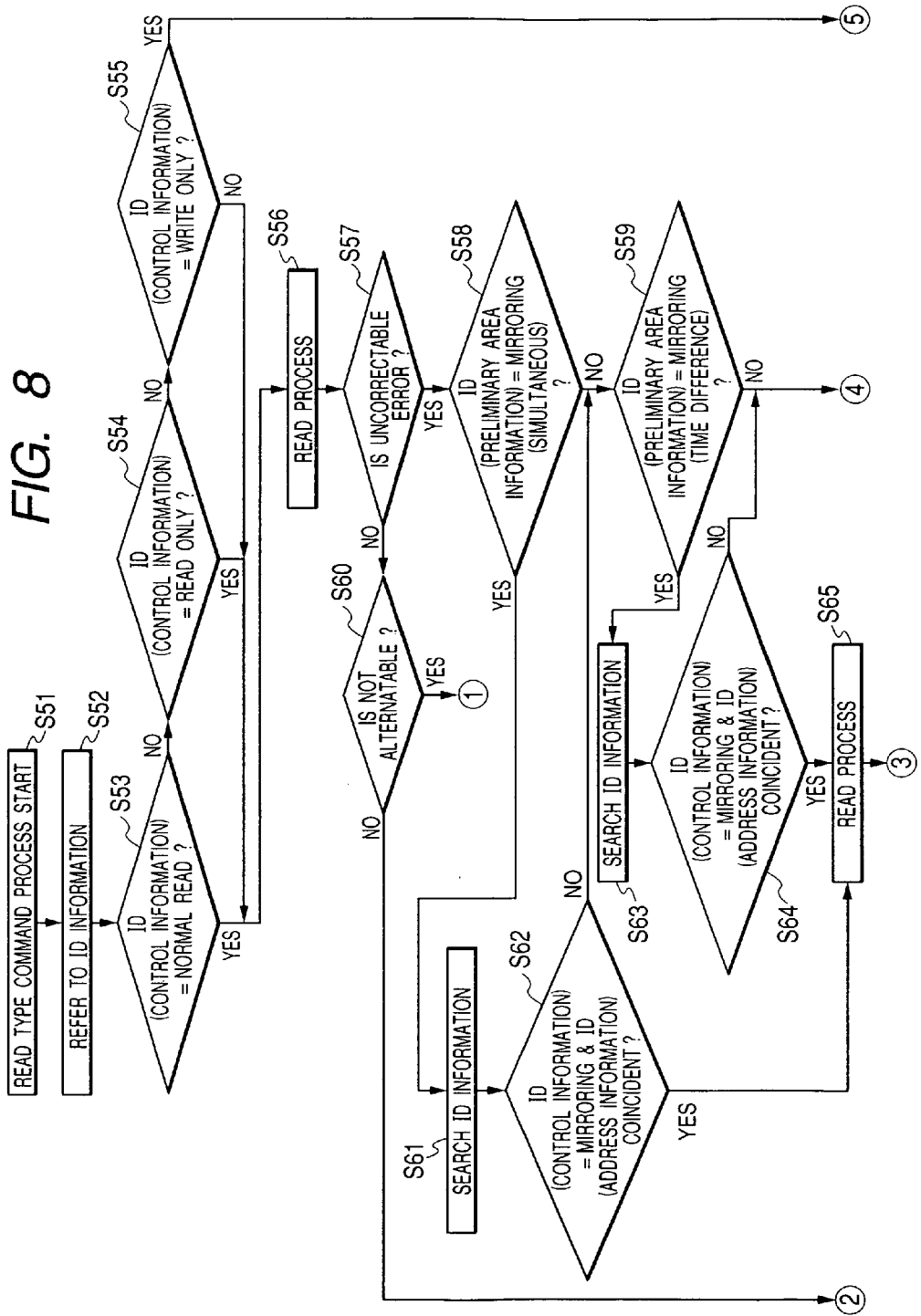
FIG. 8 is a detailed flowchart of the read type command process.
Figure 9:
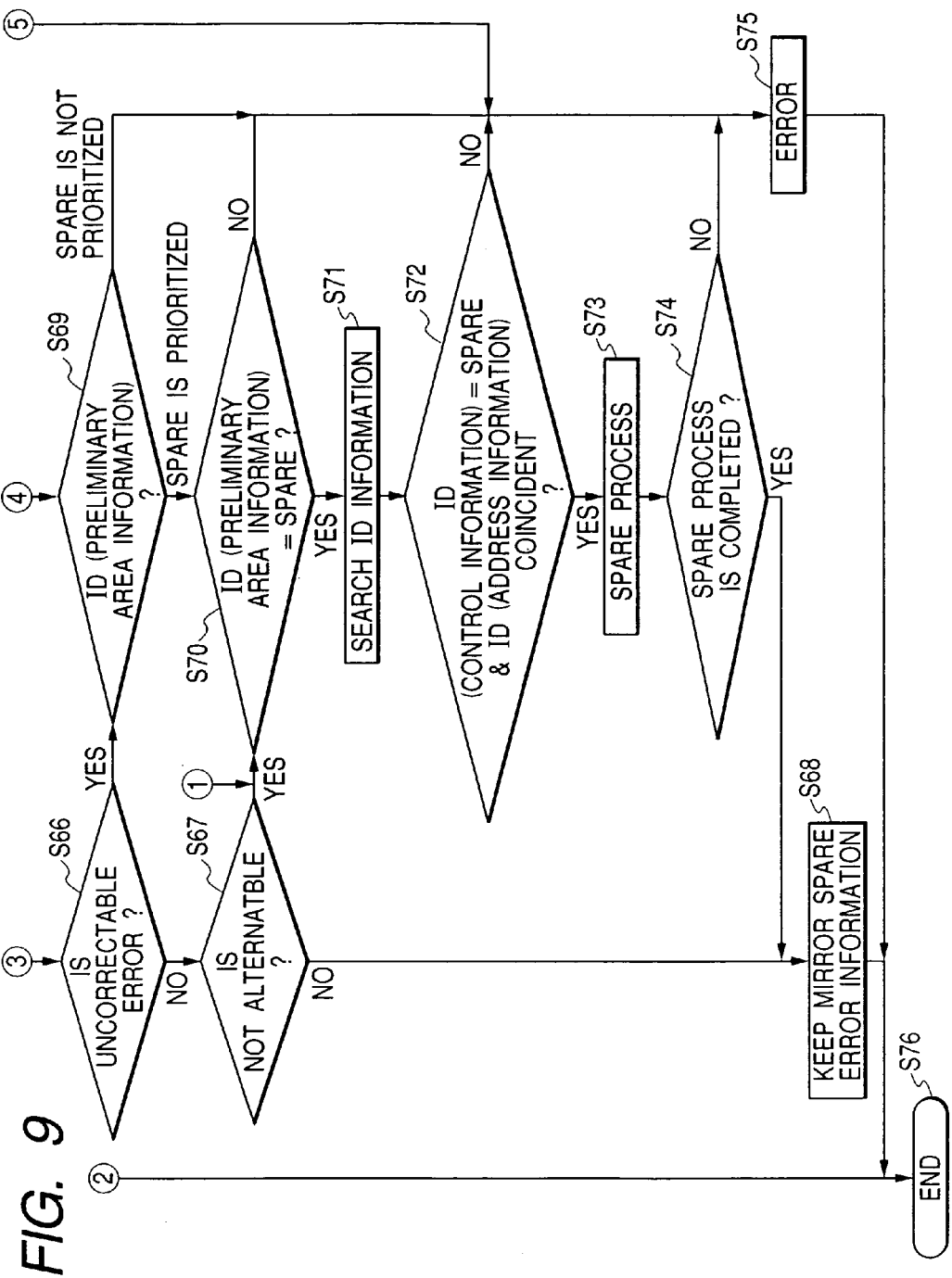
FIG. 9 is a detailed flowchart of the read type command process.

FIGS. 8 and 9 are detailed flowcharts of the read type command process (S35) of FIG. 7. At this point, ① to ⑤ of FIGS. 8 and 9 indicate that the procedures are continuous.

If the read type command process is started by the information processor 11 (S51), ID information which has been developed in RAM 114 is referenced first of all (S52), and it is judged whether or not the normal read area is set in control information (B12, B13) of ID information corresponding to the memory area as the target of read (S53). As shown in FIG. 5, if B12 and B13 as control information of ID information are "10000_0001," this means that the normal read area has been set. In the judgement at the step of S53, in the case in which it is judged that the normal read area has been set (Yes), the information processor 11 starts the read process at the step (S56) However, in the judgement at the step of S53, in the case in which it is judged that the normal read area has not been set (No), it is judge whether or not information of the read only area has been set to control information (B12, B13) of ID information corresponding to the memory area as the target of read (S53). As shown in FIG. 5, if B12 and B13 as control information of ID information are "0000_0010," it is meant that the normal read only area has been set. In other words, it is prohibited to write to the area thereof by way of write protection. At the step S54, when it is judged that the read only area has been set (Yes), the information processor 11 starts the read process (S56). However, in the case in which it is judged that the read only area has not been set (No), it is performed to judge whether or not information of the write only area has been set to control information (B12, B13) of ID information corresponding to the memory area as the target of read (S55). As shown in FIG. 5, if B12 and B13 as control information of ID information are "0000_0011," it is meant that the write only area has been set. At the step S55, in the case in which it is judged that the write only area has not been set (No), the information processor 11 starts the read process at the step (S56). However, in the judgement at the step of S53, in the case in which it is judged that the write only area has been set (Yes), error is returned since the read type command process is not appropriate, and then the procedure of the present flowchart is terminated (S75, S76).

The read process at the step of S56 includes a generating procedure at the time of causing a correctable error and an alternative procedure at the time that the memory area is alternative and it is required to alternate, other than a series of procedures in relation to reading out information from the memory device 12.

In the case in which an error is caused in information which is obtained in the read process, it is judged whether or not the error thereof is uncorrectable (S57). When it is judged that the error is not the uncorrectable error (No), judgement whether or not alternate is possible (S60). When alternate is not possible (No), the procedure of the present flowchart is terminated. Further, at the aforementioned step S60, in the case in which it is judged to alternate (Yes), judgement whether or not the spare is set in preliminary area information of ID information is performed (S70). As shown in FIG. 5, B10 and B11 as preliminary area information of ID information are any of "000_0100," "0000_0111," "0000_1111," "0000_0110," and "0000_1110," this means that there exists the spare. In the judgement at the step of S70, in the case in which it is judged that the spare exists (Yes), search of ID information starts (S71), and it is judged whether or not information of the spare area is set in control information in each ID information and the address and chip enable signal of the source of the spare agree with address information of ID information of the destination of the spare (S72). In this judgement, in the case in which it is judged that information of the spare area is set in control information and address information of ID information agrees with each other (Yes), since it means the spare for alternating, the spare process capable of alternating the memory area is performed (S73). This spare process includes a write error procedure capable of rewriting the spare area. When the data can not be written in the spare area correctly, rewrite of the data is performed. Then, whether or not the spare process is terminated is judged (S74). When judged that the spare process has been terminated (Yes), the procedures of the present flowchart are terminated after spare information is maintained (S68, S76). At the step S74, in the case in which it is judged that the spare process has not been terminated, the judgement thereof is considered as the error of the spare process, and thus the procedures of the flowchart is terminated (S75, S76).

Further, in the judgement at the step of S57, in the case in which it is judged that the error of the read process is the uncorrectable error (Yes), it is judged whether or not mirroring is set in preliminary area information of ID information of the area to be read out at the same time (S58). As shown in FIG. 5, if preliminary information (B10, B11) of ID information are any of "000_0010," "0000_0111," "0000_1111," "0000_0110," and "0000_1110," mirroring is set at the same time. In the judgement at the step of S58, in the case in which it is judged that simultaneously mirroring has been set (Yes), search of ID information starts (S61). Then, it is judged whether or not address and the chip enable signal of the source of mirroring agree with address information of ID information of the destination of mirroring (S62). In this judgement, in the case in which the simultaneous mirroring area is set in control information and in addition address information of ID information agrees with each other (Yes), since the situation thereof means the simultaneous mirror area corresponding to the area in which the aforementioned error has been caused, the read process is performed for reading out information from the area thereof (S65). In the case in which the error is caused in information that is obtained in this read process, whether or not the error thereof is uncorrectable is judged (S66). When it is judged that the error is not the uncorrectable error (No), it is performed to judge whether or not it is possible to alternate (S67). In this judgement, it is not impossible to alternate (No), information is maintained for alternating (sparing), and then the procedures of the present flowchart are terminated (S76).

When it is judged that the error is uncorrectable at the step of S66, preliminary area information of ID information is referenced, and then whether or not the spare is prioritized is judged (S69). When it is judged that the spare is prioritized, whether or not preliminary area information of ID information is set in the spare is judged (S70). When it is judged that preliminary area information of ID information is set in the spare (Yes), search of ID information starts (S71) and it is judged, in each ID information, whether or not information of the spare area is set in control information and in addition the chip select signal and address of the source of the spare agree with address information of ID information of the destination of the spare (S72). In this judgement, information of the spare area is set in control information and in addition address information of ID information agrees with each other (Yes), the spare process is performed (S73). This spare process includes a write error procedure capable of rewriting the alternating area. Further, it is judged whether or not the spare process is terminated (S74). When it is judged that the spare process is not terminated, the error response is output, and the procedure of the present flowchart is terminated (S75, S76). In addition, in the judgement at the step of S58, in the case in which it is judged that the simultaneously mirroring is not set in preliminary area information of ID information (No), whether or hot time difference mirroring is set in preliminary area information of ID information is judged. When it is judged that the time difference mirroring is not set in preliminary area information of ID information (No), the procedure is passed to the judgement of the aforementioned step S69. Further, at step S59, in the case in which it is judged that time difference mirroring is set in preliminary area information of ID information (Yes), search of ID information starts (S63) and simultaneously mirroring is set in control information in each ID information, and in addition it is judged whether or not address information of ID information agrees with each other (S64). In this judgement, in the case in which simultaneously mirroring is set in control information and in addition address information of ID information agrees with each other (Yes), since this means that there exists the simultaneous mirror area corresponding to the area which has caused the aforementioned error, processing is passed to the read process for reading out information from the area thereof (S65).

Figure 10:
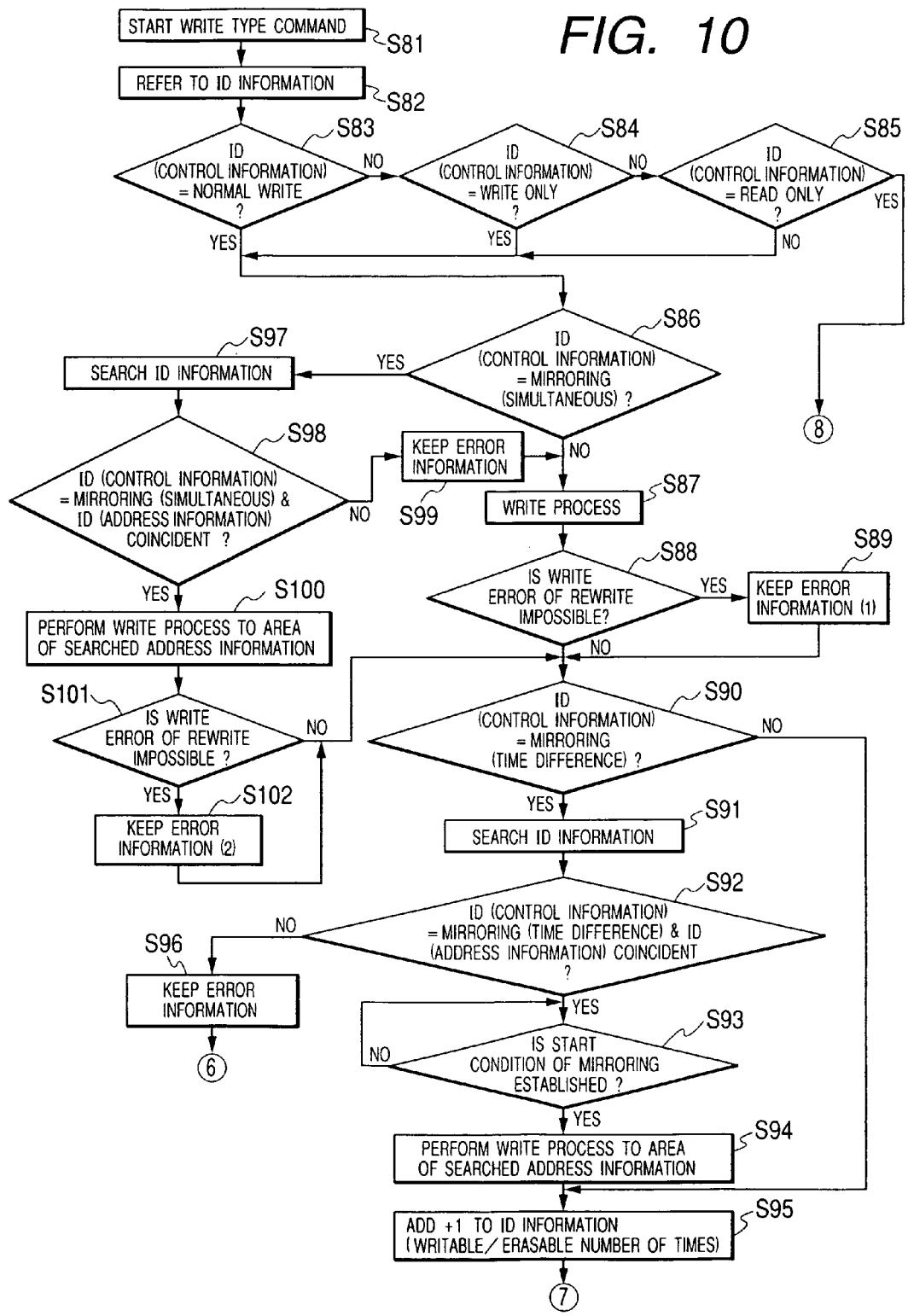
FIG. 10 is a detailed flowchart of the write type command process.
Figure 11:
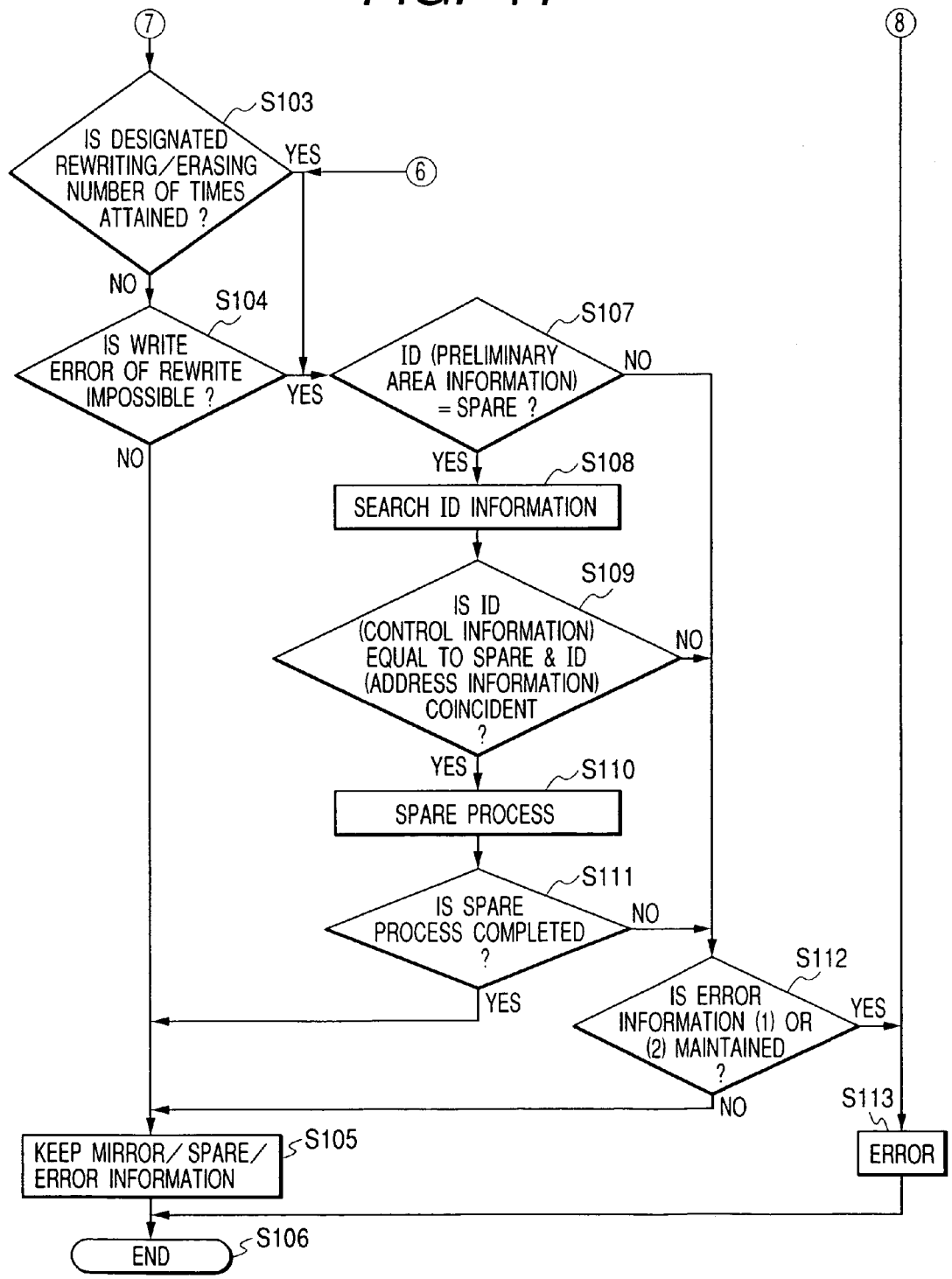
FIG. 11 is a detailed flowchart of the write type command process.

FIGS. 10 and 11 are the detailed flowcharts of the write type command process (S36) of FIG. 7. At this point, the symbols ⑥ to ⑧ of FIGS. 10 and 11 mean that the procedures are continuous.

In the information processor 11, the write type command process is initiated (S81), ID information which is developed in RAM 114 is referenced (S82), and then it is judged whether or not information of the normal write area is set to control information (B12, B13) of ID information corresponding to the memory area as the target of write (S53). If the bytes B12 and B13 as control information of ID information are defined as "0000_0001" as shown in FIG. 5, this means that the normal write area has been set. In the judgement at the step of S83, when the normal write area has been set (Yes), judgement is performed whether or not the simultaneous mirroring area is set to control information of ID information (S86). However, in the judgement at the step of S83, in the case in which it is judged that the normal write area has not been set (No), it is judged whether or not the write only area is set to control information (B12, B13) of ID information corresponding to the memory area as the target of read (S84). As shown in FIG. 5, bytes B12 and B13 as control information of ID information are "0000_0011," this means that the write only area has been set. At the step S84, in the case in which it is judged that the write only area has been set (Yes), judgement is performed whether or not the simultaneous mirroring area is set to control information of ID information (S86). However, At step S84, in the case in which it is judged that the write only area has not been set (No), judgement is performed whether or not the read only area is set to control information (B12, B13) of ID information corresponding to the memory area as the target of read (S85). As shown in FIG. 5, if bytes B12 and B13 as control information of ID information are "0000_0010," this means that the read only area has been set. In the judgement at the step of S85, in the case in which it is judged that the read only area has not been set (No), it is performed to judge whether or not the simultaneous mirroring area is set to control information of ID information (S86). However, in the judgement at the step of S85, in the case in which it is judged that the read only area has been set (Yes), processing is terminated by the error since the write type command process is inappropriate (S113, S106).

In the judgement at the step of S86, in the case in which it is judged that the simultaneous mirroring area has not been set (No), the write process for writing information to the memory device 12 is performed (S87). This write process includes a write error procedure capable of rewriting the alternating area. Then, in the case in which the error is caused in the write process at the step of S87, whether or not the write error is the error of prohibiting rewriting is judged (S88). In the judgement thereof, in the case in which the error is not the write error of prohibiting rewriting (No), judgement whether or not the time difference mirroring area is set to control information of ID information is performed (S90). In addition, at the step S88, in the case in which it is judged that the error is the write error of prohibiting rewriting (Yes), processing is passed to the judgement of the aforementioned step of S90 after error information (1) thereof has been kept up in RAM 114 and the like (S89).

At this stage, in the judgement at the step of S86, the simultaneous mirroring area is set to control information of ID information (Yes), search of ID information starts (S97), and it is judged in each ID information whether or not the mirroring area is set to control information and also address information of ID information agrees with each other (S98). In this judgement, when it is judged that the simultaneous mirroring area has not been set to control information (No), after error information thereof is kept up in RAM 114 and the like (S99), processing is passed to the write process at the step of S87. In addition, at the step S98, in the case in which it is judged that the simultaneous mirroring area has been set to control information and also address information of ID information agrees with each other (Yes), the write process for mirroring is performed to the area of address information which is searched in the search procedure of the step S97 (S100). The write process at this stage includes the write error procedure capable of rewriting the alternating area. In addition, in the case in which the error is caused in the write process at the step S100, judgement whether or not the error thereof is the write error of prohibiting rewriting is performed (S101). In this judgement, the error is not the write error of prohibiting rewriting (No), processing is passed to the judgement at the step S90. Further, at the step S101, in the case in which it is judged that the error is the write error of prohibiting rewriting (Yes), processing is passed to the judgement at the step S90 after error information (2) thereof is stored in RAM 114 and the like.

At the step S90, in the case in which it is judged that the time difference area has been set to control information of ID information (Yes), search of ID information starts (S91), and it is judged whether or not the time difference mirroring area is set to control information and also address information of ID information agrees with each other (S92). In this judgement, in the case in which the time difference mirroring area is set to control information and also address information of ID information agrees with each other (Yes), whether or not the starting condition of mirroring is established is judged (S93) At this stage, as the starting condition of mirroring, though it is not limited especially, there are the case in which time which has been set in advance as the condition of time difference mirroring is measured by a timer and the case in which the write process has been terminated.

At the step S93, in the case in which it is judged that starting condition of time difference mirroring is established (Yes), the write process for mirroring is performed to the memory area corresponding to searched address information (S94). Further, after the write process thereof has been terminated, ID information is updated by incrementing the rewriting/erasing number of times (B0 to B4). Further, in the judgement at the step of S90, in the case in which it is judged that the time difference mirroring area is not set to control information of ID information (No), since mirroring is not required, procedure is passed to the increment procedure at the step of S95 without performing the procedure for performing aforementioned mirroring.

Then, it is judged whether or not the rewriting/erasing number of times (B0 to B4) of aforementioned ID information attains the prescribed value in view of the reliability of the data (S103). In this judgement, when the rewriting/erasing number of times of ID information does not attain the prescribed value (No), judgement whether or not the write error of prohibiting rewriting is caused is performed (S104). When it is judged that the write error of prohibiting rewriting is not caused (No), mirroring information is maintained, and then the procedure of the present flowchart is terminated (S105, S106). Further, at the step S103, in the case in which the rewriting/erasing number of times (B0 to B4) of ID information has attained the prescribed value (Yes), in the case in which it is judged that the write error of prohibiting rewriting is caused in the judgement at the aforementioned step S104 (Yes), and after the error information is stored at the aforementioned step S96, whether or not the spare has been set to preliminary area information of ID information is judged (S107). In this judgement, in the case in which it is judged that spare has been set to preliminary area information of ID information (Yes), search of ID information starts (S108), and judgement in each ID information is performed whether or not the mirroring area is set to control information and also address information of ID information agrees with each other (S109). When it is judged that the spare area is set to control information and also address information of ID information agrees with each other (Yes), the spare process is performed (S110), and then judgement whether or not the spare process has terminated is performed (S111). In this judgement, in the case in which it is judged that the spare process has terminated (Yes), spare information is maintained, and then the procedure of the present flowchart is terminated (S105, S106). Further, in the judgement at the step S107, in the case in which the spare has not been set to preliminary area information of ID information (No), in the case in which the spare area is not set to control information and also address information of ID information does not agree with each other (No), and further in the case in which the spare process has not been terminated in the judgement at the step of S111 (No), judgement whether or not the error information (1) and (2) is kept up is performed (S112). In this judgement, in the case in which it is judged that error information (1) and (2) is not kept up (No), spare information is kept up, and then the procedure of the present flowchart is terminated (S105, S106). Further, in the judgement at the step of S112, in the case in which it is judged that aforementioned error information (1) and (2) is kept up (Yes), the procedure of the present flowchart is terminated (S113, S106).

Figure 12:
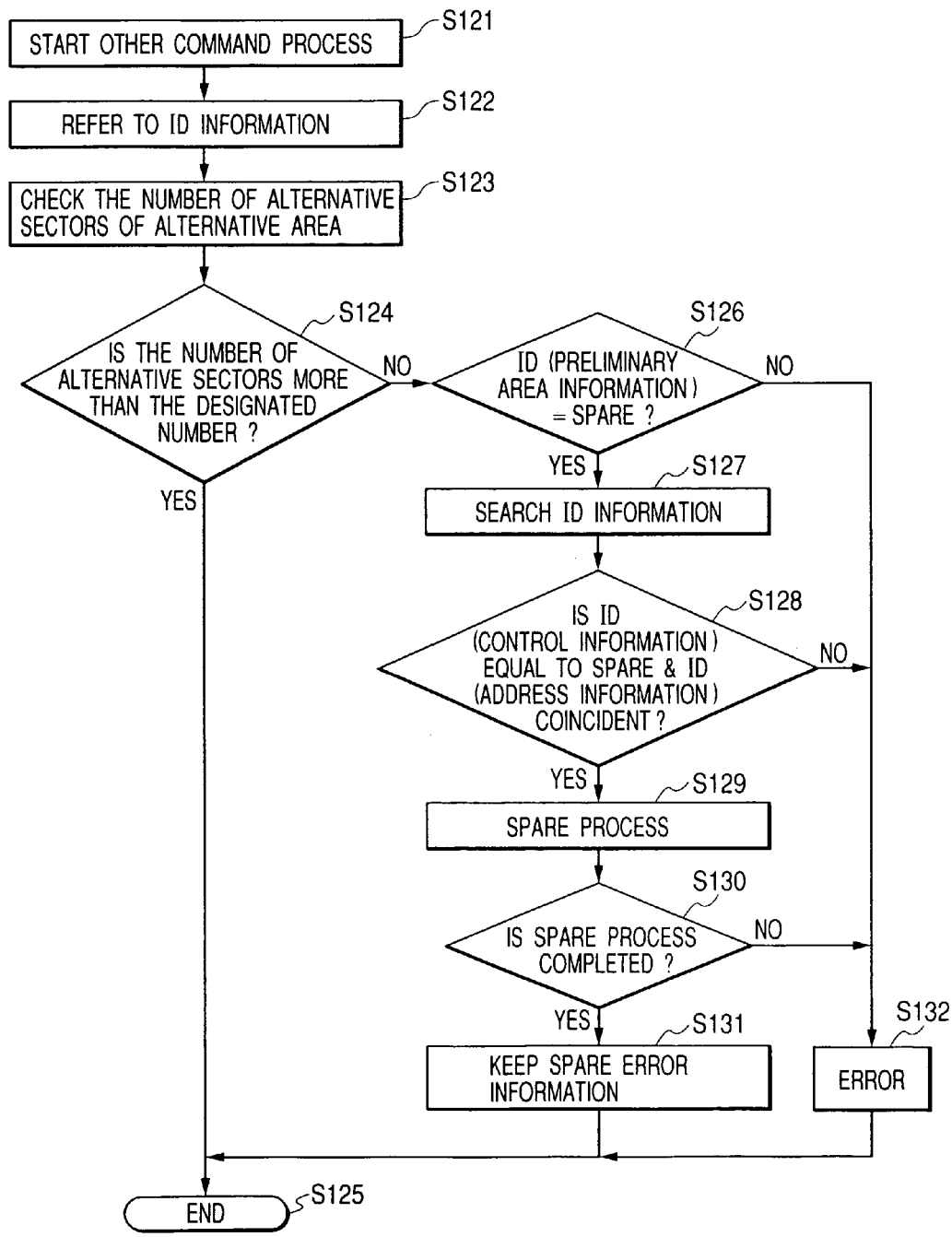
FIG. 12 is a detailed flowchart of other command processes.

FIG. 12 is the detailed flowchart of other command process (S37) of FIG. 7. Though it is not limited especially, the command thereof is defined as the command of indicating "check alternating empty area."

In the information processor 11, if other command process is started (S121), ID information is referenced (S122) first of all, and then the number of alternative sectors of the alternating area is checked (S123). In this checking the number of alternative sectors of the alternating area, whether or not the number of the alternative sectors is more than the designated number is judged (S124). When it is judged that the number of the alternative sectors is more than the designated number (Yes), the procedure of the flowcharts is terminated by obtaining information thereof (S125).

Further, at the step S124, in the case in which it is judged that the number of the alternative sectors is not more than the designated number (No), judgement whether or not the spare is set to preliminary area information of ID information is performed (S126). As shown in FIG. 5, if bytes B10 and B11 as preliminary area information of ID information are any of "000_0100," "0000_0111," "0000_1111," "0000_0110," and "0000_1110," it is meant that there exists the spare. In the judgement at the step of S126, in the case in which it is judged that there exists the spare (Yes), search of ID information starts (S127), and information of the spare area is set in control information and also the address and chip enable signal of the source of the spare agree with address information of ID information of the destination of the spare (S128). In the case in which it is judged that information of the spare area is set in control information and also the address information of ID information agrees with each other (Yes), since the situation thereof means that the spare is for alternating, the spare procedure capable of alternating the memory area is performed (s129). This spare process includes the write error process capable of rewriting the alternating area. Then, it is performed to judge whether or not the spare process is terminated (S130). In the case in which it is judged that the spare process has been terminated (Yes), the procedures of the present flowchart are terminated (S131, S125) after spare information thereof is maintained. Further, at the step S126, in the case in which it is judged that the spare process is not terminated, in the case in which it is judged that the spare area is not set to control information and also address information of ID information does not agree with each other (No), and in the case in which it is judged that the spare process is not terminated at the step of S130 (No), the procedures of the present flowchart are terminated by the error (S132, S125).

Then, it is described herein to explain how aforementioned ID information is edited.

Figure 13:
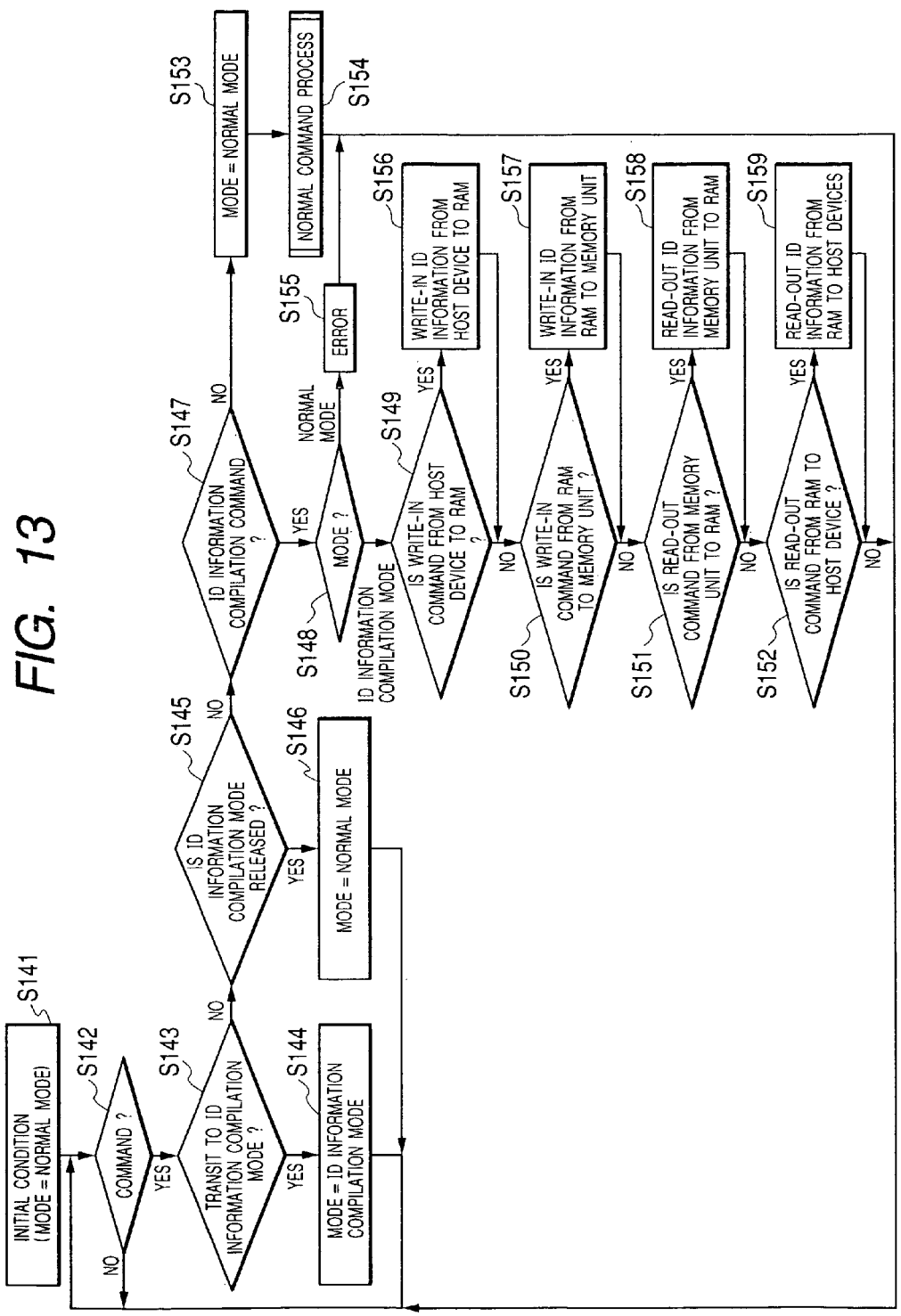
FIG. 13 is a flowchart of the ID information edit process.
Figure 14:
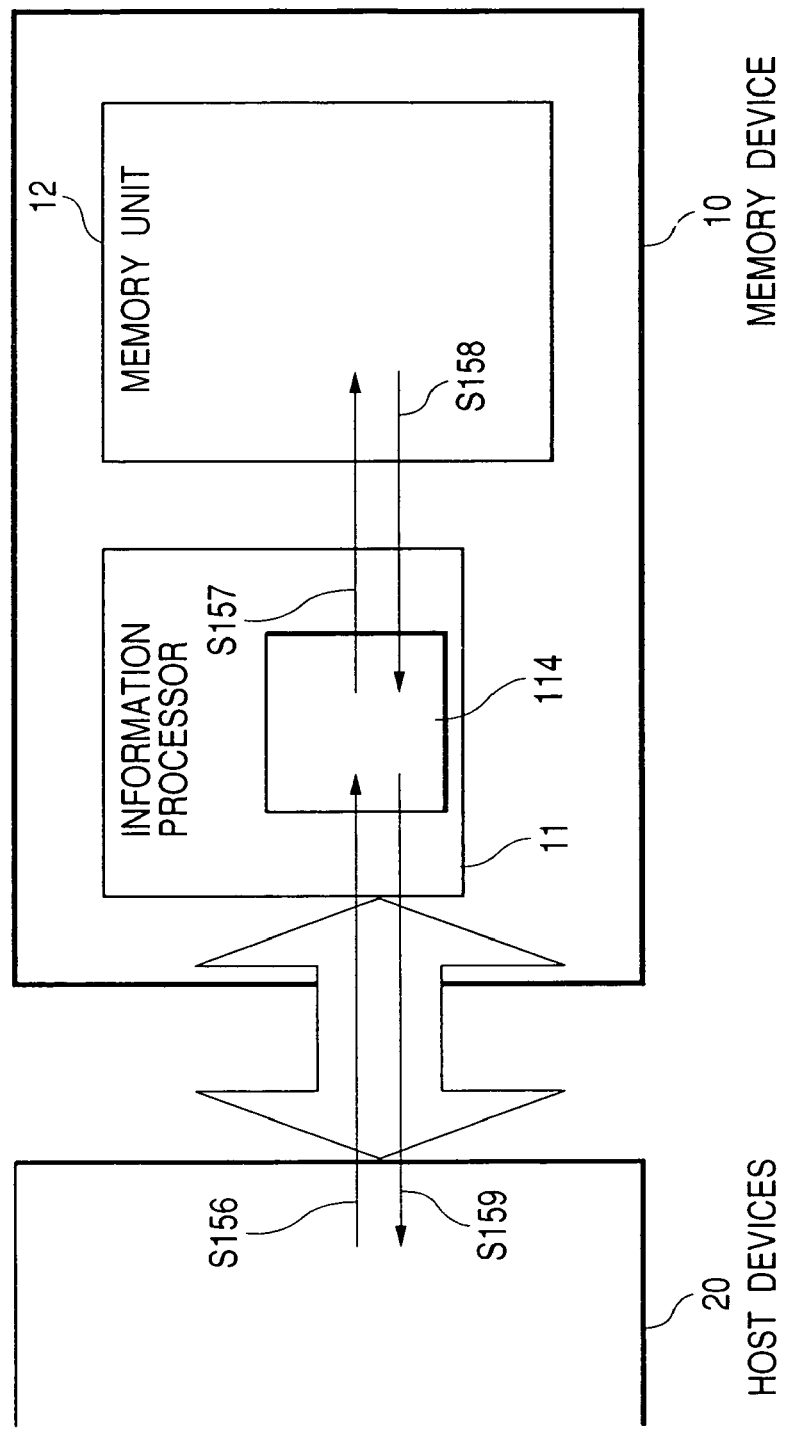
FIG. 14 illustrates the flow of the signals of the aforementioned ID information edit process.

FIG. 13 is the flowchart of the procedures of editing ID information. Further, FIG. 12 is a transmitting path of a signal for editing ID information.

The initial mode is defined as the normal mode (S141). Whether or not that the command has been given is judged (S142). In this judgement, the command has been given (Yes), the command thereof is analyzed. First of all, it is judged whether or not the command thereof designates the transition to an ID edit mode (S143). When it is judged that the command thereof designates the transition to an ID edit mode (Yes), the operation mode is transited to the ID information edit mode from the normal mode (S144), and then the procedure is returned to the condition of waiting the command. Further, in the judgement at the step of S143, in the case in which it is judged that the command thereof does not designate the transition to an ID edit mode (No), it is performed to judge whether or not it is designated to release the ID information edit mode (S145). When it is judged that it is designated to release the ID information edit mode (Yes), the operation mode is transited to the normal mode from the ID information edit mode (S146), and then the procedure is returned to the command waiting condition. Further, when it is judged that it is not designated to release the ID edit mode in the judgement at the step of S145 (No), whether or not the command is the ID information edit command is judged (S147). In the case in which it is judged that the command is not the ID information edit mode (No), the mode is defined as the normal mode and the procedures are transited to the command input waiting condition after the normal command procedures are performed. At the step S147, in the case in which it is judged that the command is the ID information edit mode (Yes), the present mode is judged (S148). When it is judged that the mode is defined as the normal mode, the processing result is an error (S155), and then the procedure is transited to the command input waiting condition. At the step S148, in the case in which it is judged that the command is the ID information edit mode, it is performed to judge whether or not the command is the write-in command from the host device 20 to RAM 114 (S149) In this judgement, when the command is not the write-in command from the host device 20 to RAM 114 (No), it is performed to judge whether or not the command is the write-in command from RAM 114 to the memory device 12 (S150). Further, in the judgement at the step of S149, when the command is the write-in command from the host device 20 to RAM 114 (Yes), the procedural step is transited to the judgement at the step of S150 after ID information is written in RAM 114 from the host device 20 (S156).

At the step S150, when it is judged that the command is not the write-in command from RAM 114 to the memory device 12 (No), judgement whether or not the command is the readout command from the memory device 12 to RAM 114 is performed (S151). Further, in the judgement at the step of S150, when the command is the write-in command from RAM 114 to the memory device 12 (Yes), after ID information is written in the memory device 12 from RAM 114 (S157), the procedural step is transited to the judgement at the step of S151. At the step S151, in the case in which it is judged that the command is not the readout command from the memory device 12 to RAM 114 (No), judgement whether or not the command is the readout command from RAM 114 to host device 20 is performed (S152). In this judgement, when the command is not the readout command from the memory device 12 to RAM 114 (No), it is performed to judge whether or not the command is the readout command from RAM 114 to host device 20. In this judgement, in the case in which it is judged that the command is not the readout command from RAM 114 to host device 20 (No), the procedural step is transited to the step for waiting the input of the command. Further, at the step S152, in the case in which it is judged that the command is the readout command from RAM 114 to host device 20 (Yes), the procedural step is transited to the step for waiting the input of the command after ID information is readout from RAM 114 to host device 20 (S159).

Figure 15:
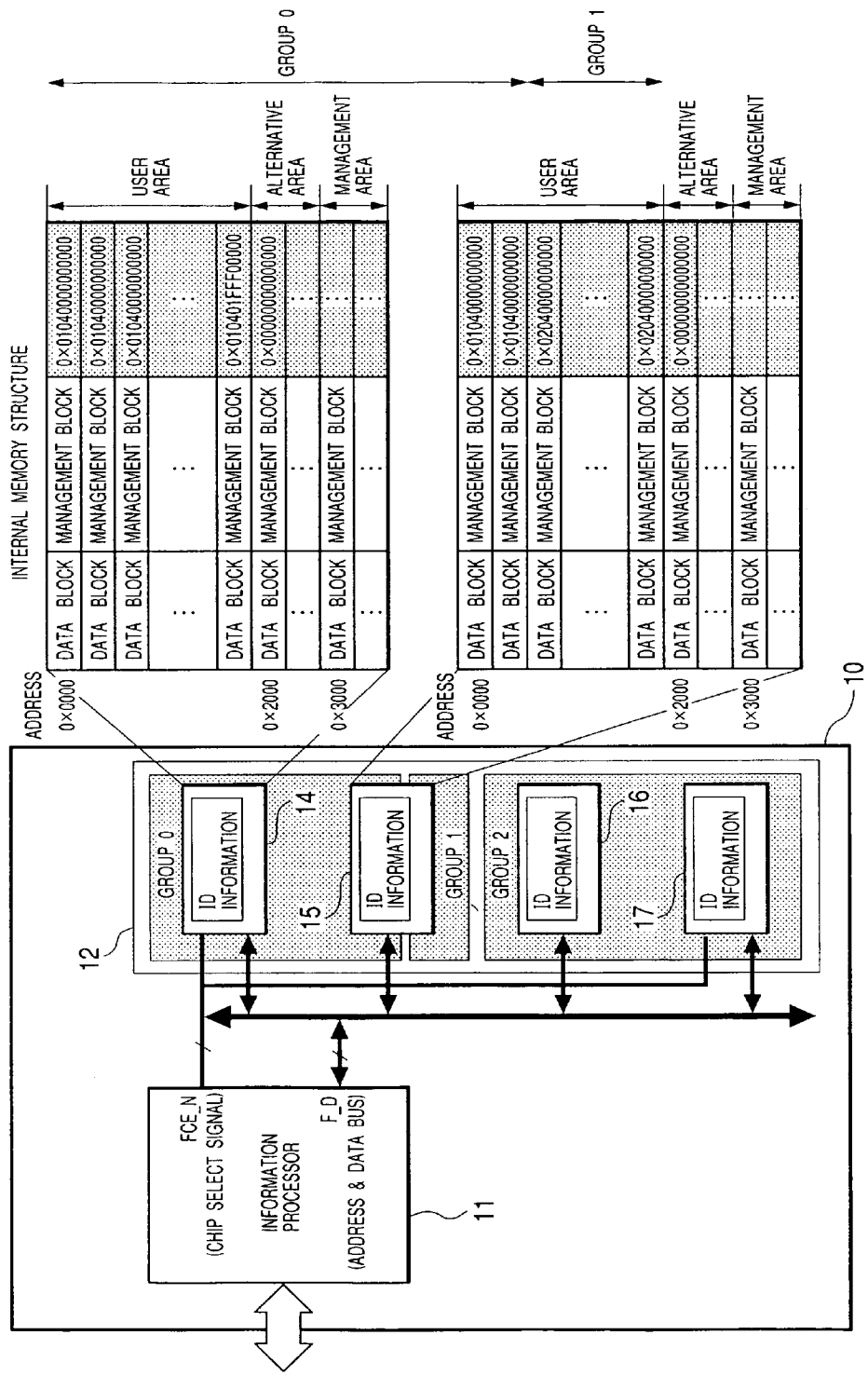
FIG. 15 is a block diagram of the other structures of the aforementioned memory unit.

FIG. 15 is a block diagram of the memory unit in the case in which ID information is stored by each sector unit or by each block unit.

The big different point between the structure of FIG. 15 and that of FIG. 1 is in a point in which each storing area of ID information is formed in memories 14, 15, 16, 16, and 17 and ID information corresponding to respective memories 14, 15, 16, 16, and 17 is stored in this storing area of ID information. For example, for the memory 14, the data block and the management block corresponding thereto are provided in this memory 14, and ID information is allocated in accordance with the data block and the management block. ID information itself is the same information as FIG. 5. Corresponding data block can be controlled separately in accordance with this ID information. For other memories 14,

15, 16 and 17, the internal structure of the memory has the same memory as the aforementioned memory 14.

Figure 16:
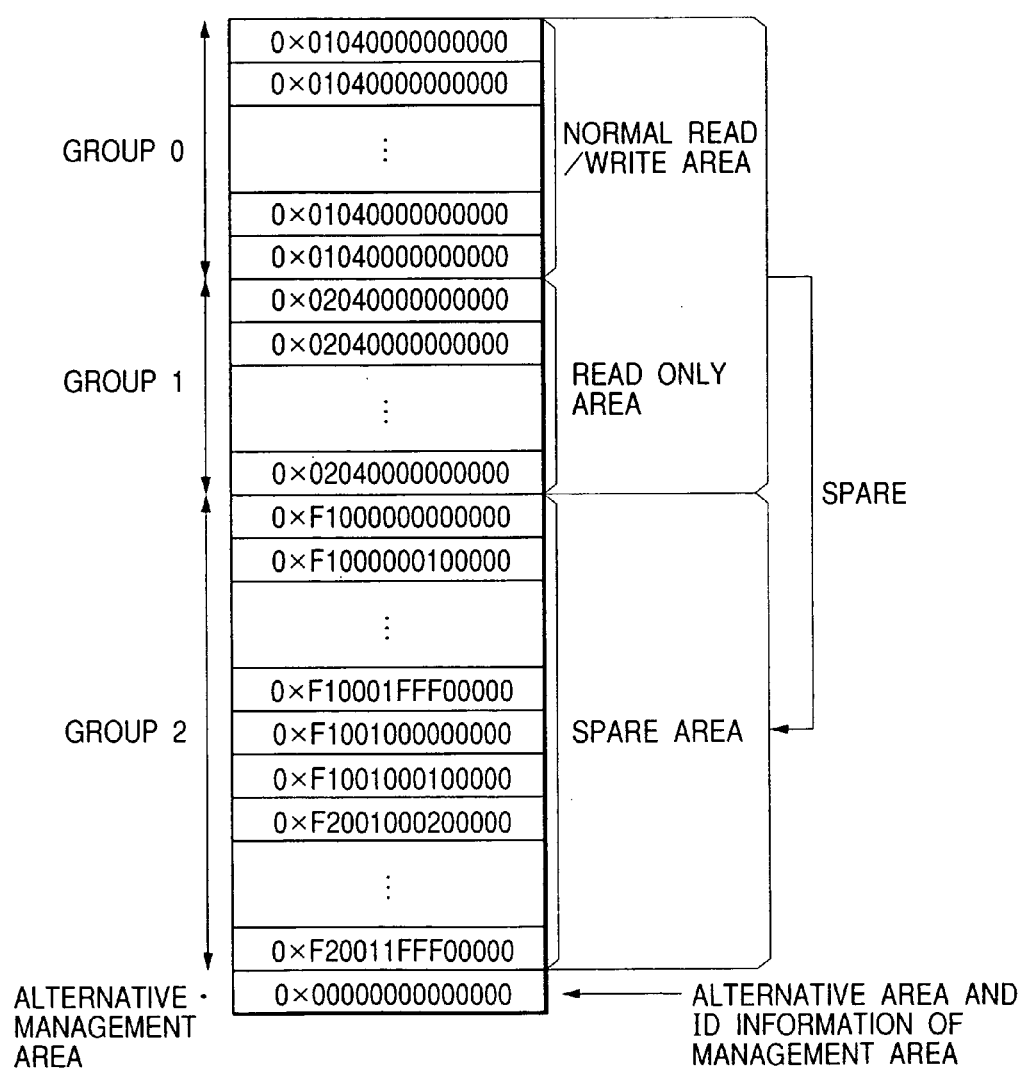
FIG. 16 illustrates an example of the table structure of ID information in the case in which the structure of FIG. 15 is adopted.

FIG. 16 is a table structure of ID information in the case in which the structure of FIG. 15 is employed. In this example, the group 0 is set in the normal read/write area, the group 1 is set in the read only area, and the group 2 is set in the spare area. Further, the memories 14, 15, 16 and 17 include respective alternative areas and management information and those alternative areas and management information are allocated. Those alternative areas and management information, however, are areas for managing the memories with reference to the origin, so it is not appropriate to have attributes in accordance with ID information. Thus all "00" are assigned to ID information thereof and ID information thereof should not be managed independently. Needless to say, it comes to possible to control independently by rewriting this ID information. Accordingly, it is possible to manage by rewriting only ID information for altering the alternative areas and managing areas.

At this stage, the basic flows of the initial stage of ID information, the normal process of ID information, the read type command process, the write type command process, the other command process, and the ID information editing process are considered as the same flows as FIGS. 6 to 13. However, ID information is stored by each sector unit or by each block unit in the present example, thus the table of ID information is not developed in RAM 114. Accordingly, with reference to ID information, ID information, which is not stored in RAM 114 and not developed in RAM but stored in memories 14 to 17, is referenced individually.

In accordance with the aforementioned examples, the following effects can be obtained.

(1) When ID information, which is capable of controlling individually each memory area for accessing from outside, is tabled in ID information storing memory 13 and for control information (B12, B13) of aforementioned ID information, data can be readout from the area thereof in the case in which read only area is defined. Since it is prohibited to write data in the area thereof, in the case in which there exist data, which should not be rewritten or erased erroneously by a public user, of data of the memory area in which the read only area is set, data thereof can be protected by setting data in the memory area in which the read only area is set.

(2) For control information (B12, B13) of ID information, in the case in which the write only area is set, since it is possible to protect reading out data from the area thereof based thereon, in the case in which it is needed to log a user's usage condition, for example, it is possible to let the log thereof not to be read by the user by designating the area for setting the log thereof as a write only area.

(3) If the simultaneous mirroring area is set in control information (B12, B13) of ID information, it is possible to use the area which is managed by this ID information as simultaneously mirroring. Thus, since backup of data that are stored in other memory areas can be performed, in the case in which an uncorrectable error is caused, data to which simultaneously mirroring is performed instead of data thereof can be used.

(4) If the time difference mirroring area is set in control information (B12, B13) of ID information, it is possible to use the area which is managed by this ID information as time difference mirroring. Thus, since backup of data in a time difference manner, which are stored in other memory areas can be performed, in the case in which an uncorrectable error is caused, it is possible to use data to which aforementioned time difference mirroring is performed instead of data thereof.

(5) If the spare area is set in control information (B12, B13) of ID information, it is possible to use the area which is managed by this ID information as the spare area.

(6) In the case in which information (B0 to B4) of the rewriting number of times or erasing number of times is included in ID information and the rewriting number of times or erasing number of times has attained a prescribed number of times by incrementing the rewriting number of times or erasing number of times at each time that the memory area is rewritten or erased, it is possible to improve the reliability of data by using the spare area instead of the memory area thereof.

(7) Since ID information can be edited only by a managing information editing step of giving a prescribed command from the host device 20, it is possible to prevent ID information from being rewritten by the user unintentionally. Further, since the procedural step is transited to the ID information edit step by giving a prescribed command from the host device 20 and it comes to be possible to edit ID information, it is possible to alter easily the contents of an individual control by each area.

While the invention has been explained concretely, it goes without saying that the present invention is not limited thereto but can be possibly changed variously without changing the gist thereof.

Figure 17:
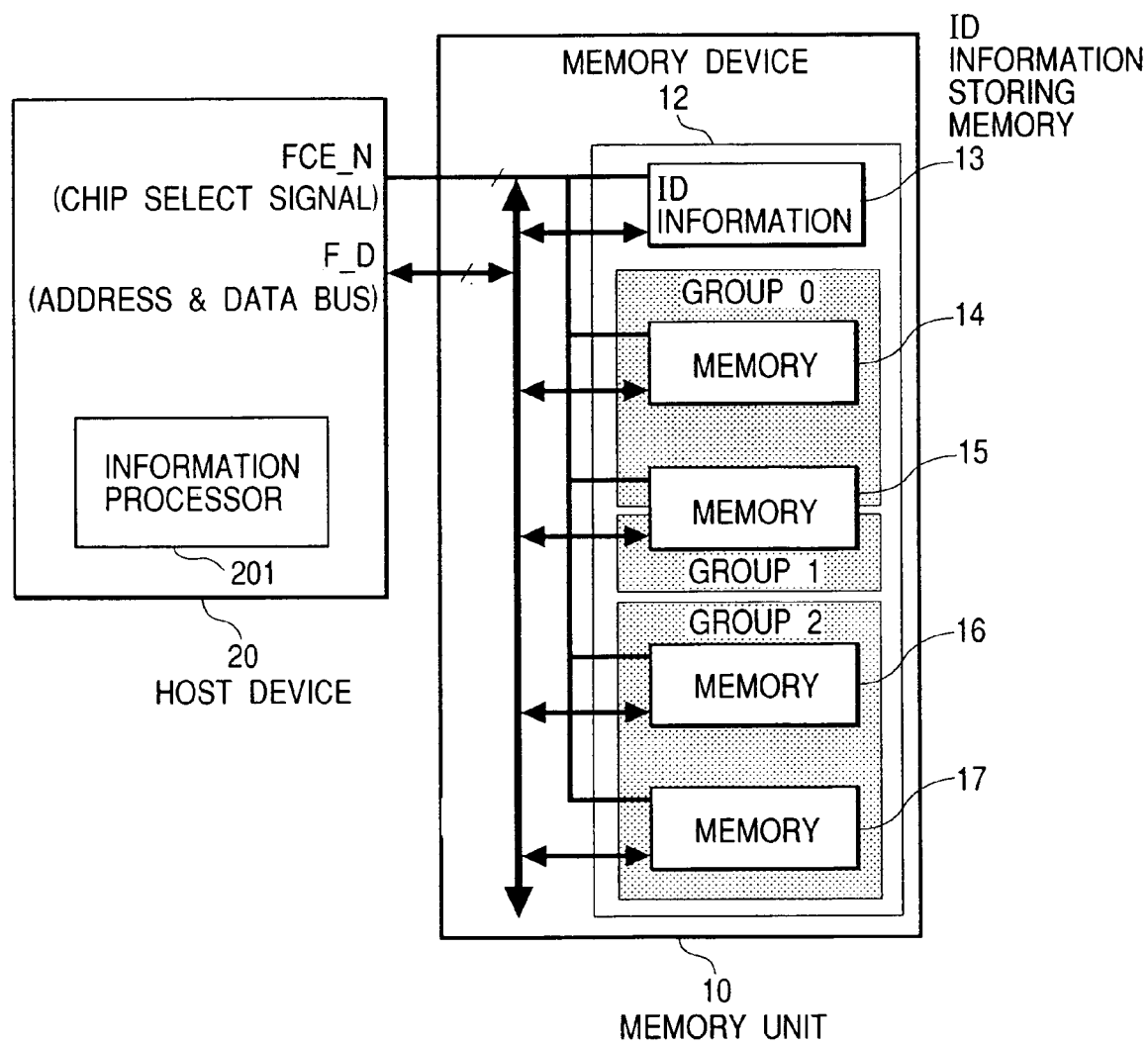
FIG. 17 is a block diagram of another structure of the aforementioned memory unit.
Figure 18:
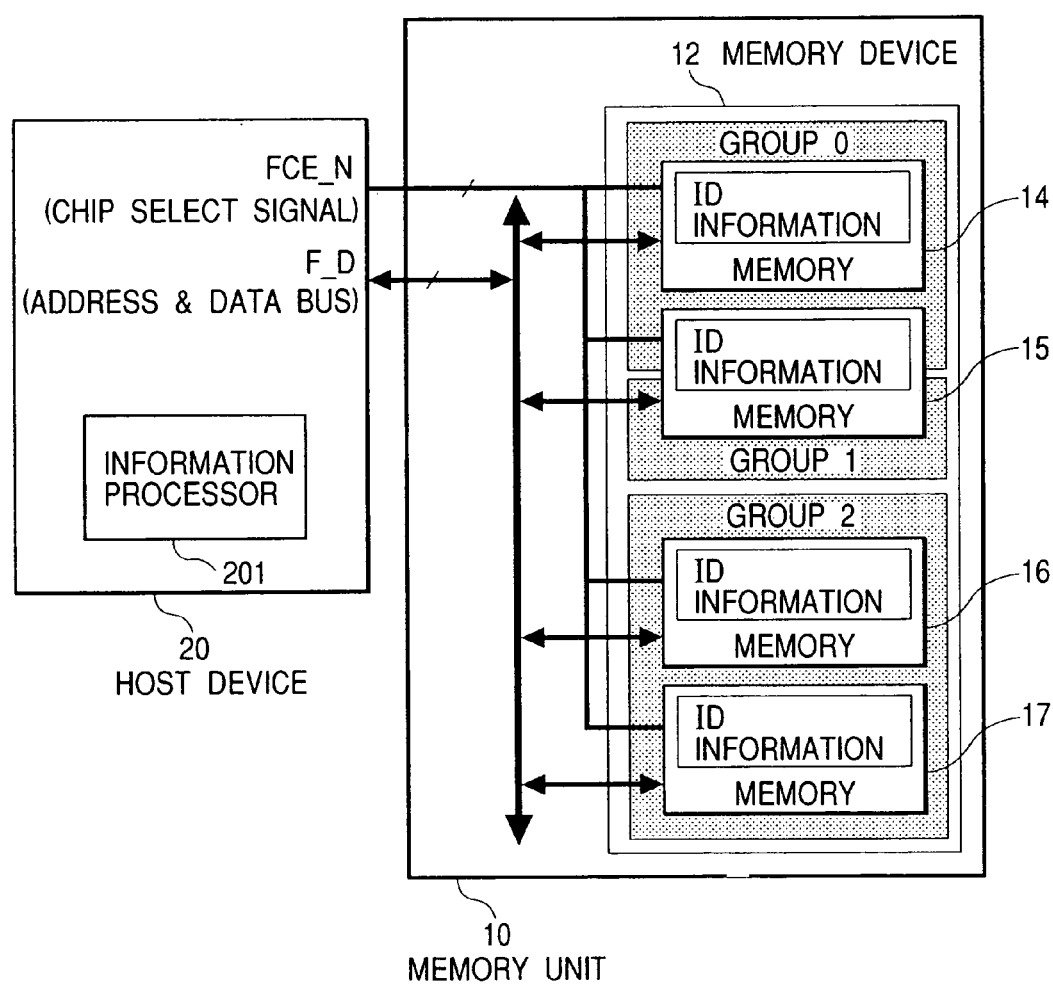
FIG. 18 is a block diagram of still another structure of the aforementioned memory unit.

For example, as shown in FIGS. 17 and 18, it may be possible to have an information processor 201 in the host device 20. The information processor 201 is structured by way of hardware and corresponds to the information processor 11 as shown in each of FIGS. 1 and 15 functionally. That is to say, the memory unit 10 of FIGS. 1 and 15 includes the information processor 11. If the circuit having the same function as this information processor 11 is installed in the host device 20, since there is no need to provide an element corresponding to the information processor 201, the size and weights of the memory unit 10 can be reduced effectively.

Figure 19:
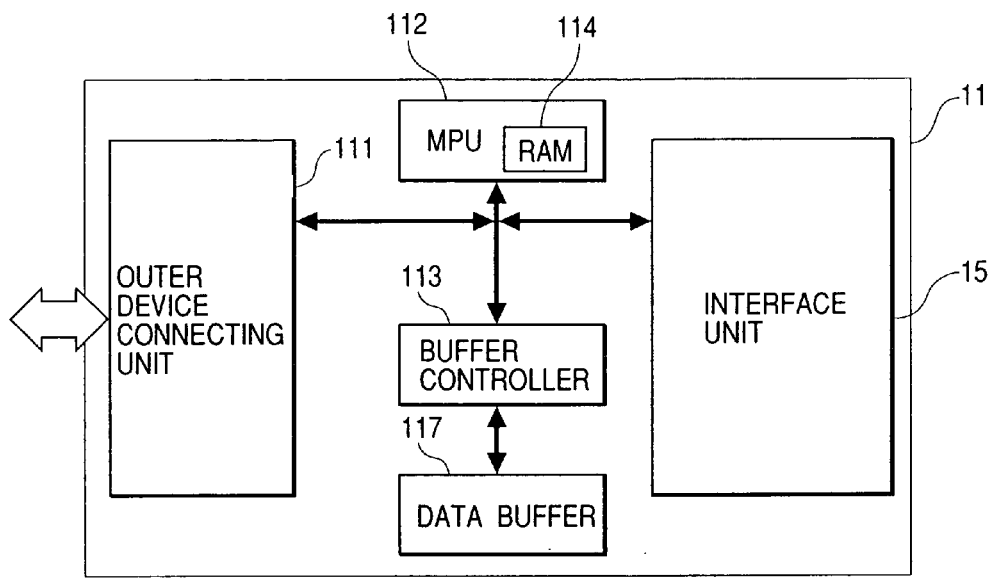
FIG. 19 is a block diagram of still another structure of information processing unit of the aforementioned memory unit.

Further, as shown in FIG. 19, RAM 114 may be included in MPU 112. In this case, ID information is developed in RAM 114 that is included in MPU 112 and it is possible to reference it at the time of processing information of MPU 112. A data buffer 117 performs buffering of transmitting data under the buffer controller 113.

Figure 20:
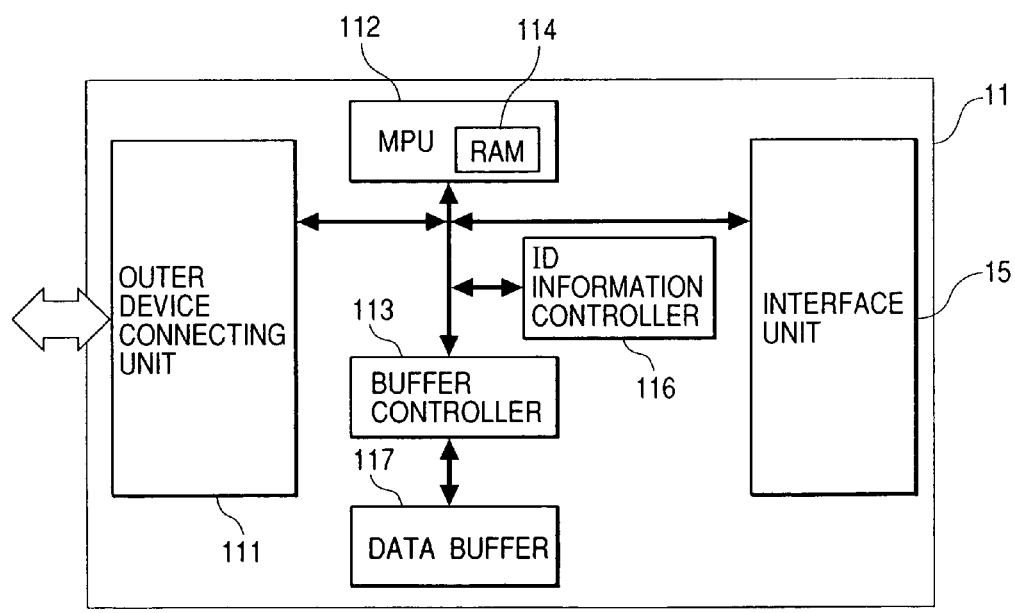
FIG. 20 is a block diagram of still another structure of information processing unit of the aforementioned memory unit.

Further, as shown in FIG. 20, it is possible to structure in such a way that ID information controller 116 which is special hardware for controlling ID information is provided and individual information by each memory area for accessing from the outside is processed by this ID information controller 116. In this case, since individual control by each memory area for accessing from the outside is performed by the ID information controller 116 as exclusive hardware, it is possible to speed up processing when MPU 112 being processed is compared.

Figure 21:
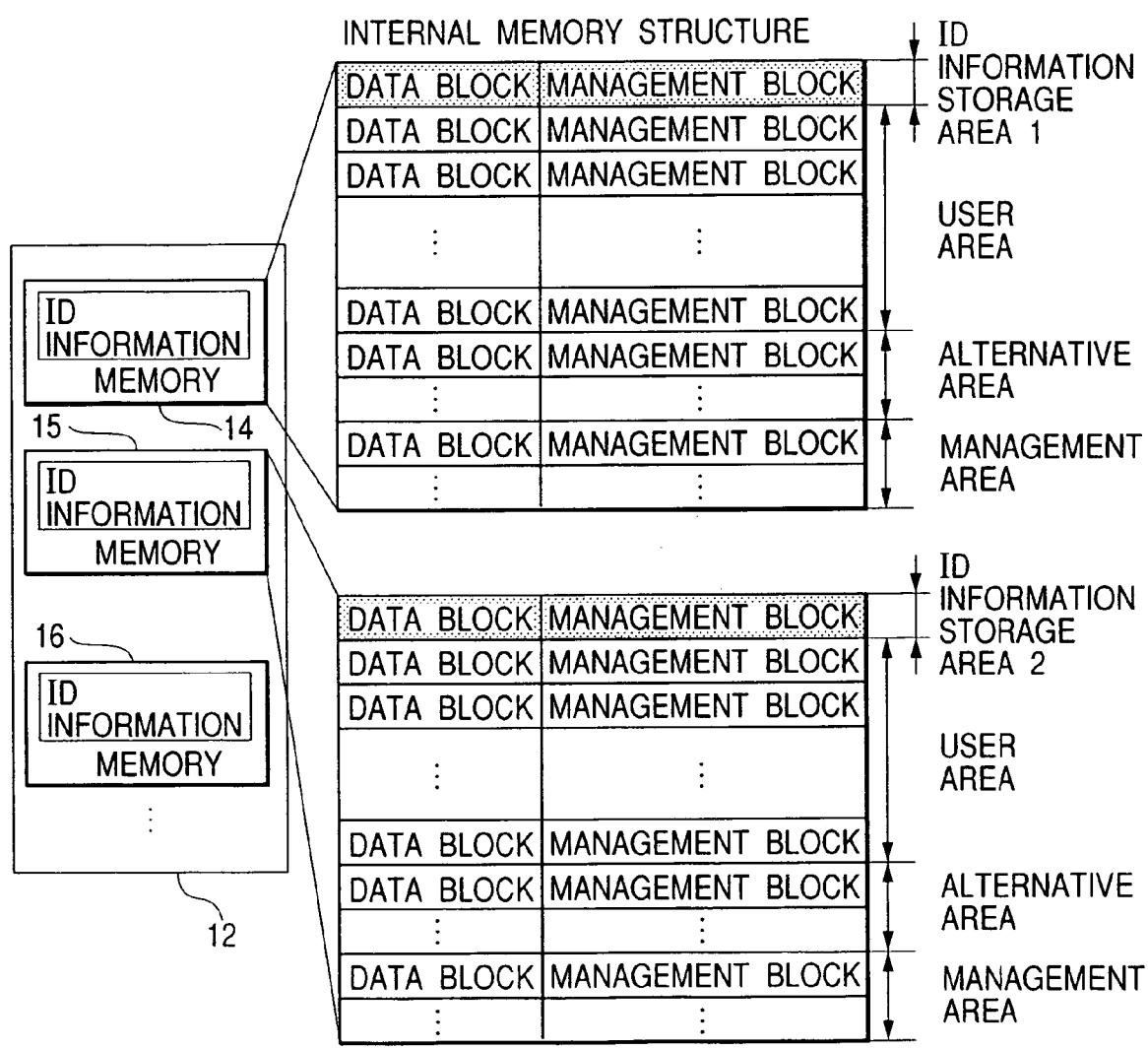
FIG. 21 is another explanatory view of storing ID information of the aforementioned memory unit.

As shown in FIG. 21, it may be possible to provide ID information storing area by each memory and to store ID information by each memory in this ID information storing area.

Figure 22B:
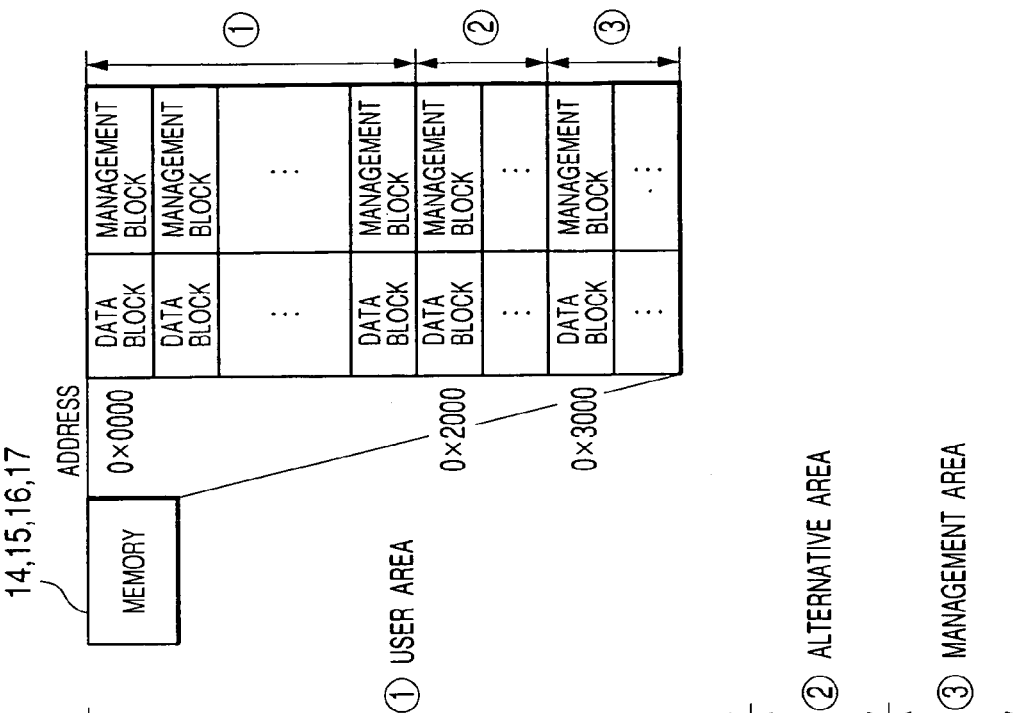
FIGS. 22A and 22B are other explanatory views of other memories and ID information storing memories of the aforementioned memory unit.
Figure 22A:
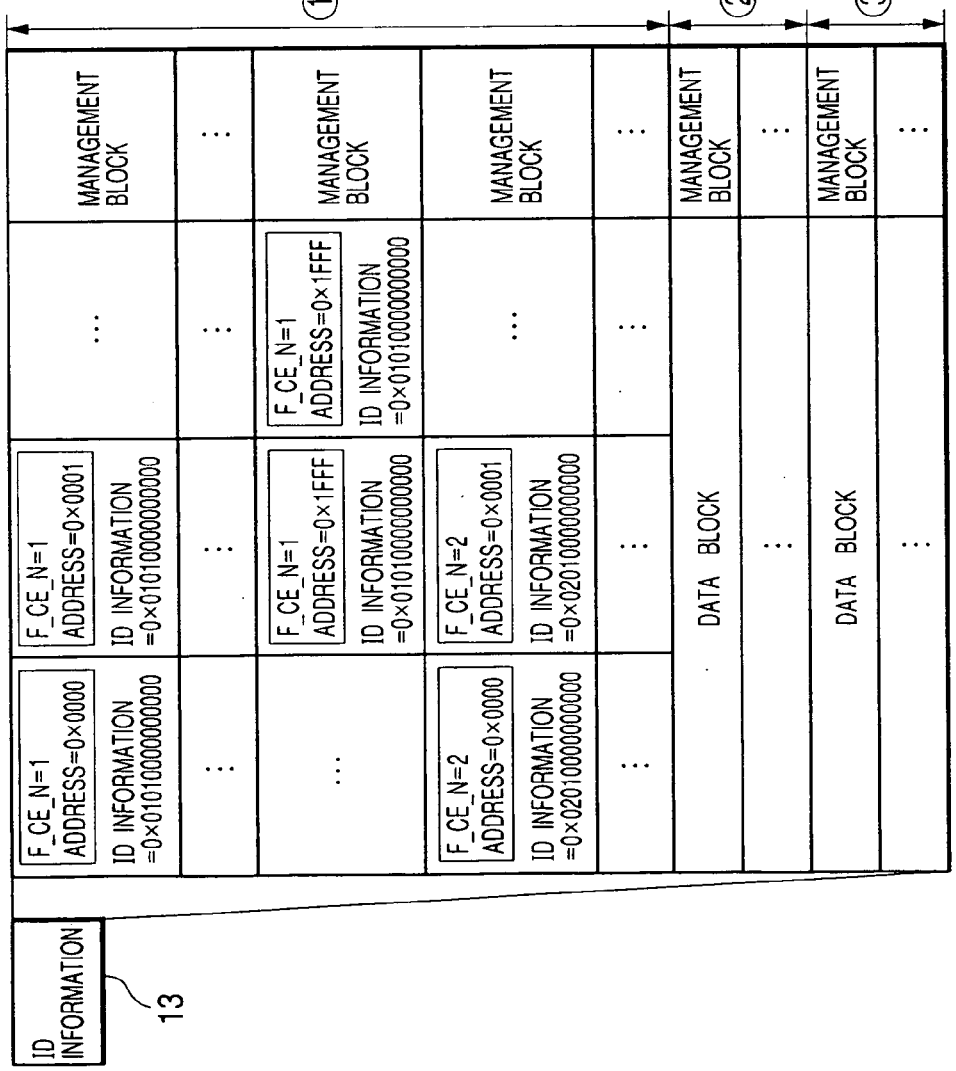

Further, as shown in FIG. 22(B), it may be possible not to provide ID information of FIG. 22(A) in alternative area ② and managing area ③ of memories 14, 15, 16 and 17. In the example of FIG. 22, addresses after "0x2000" are alternative area ② and managing area ③ and ID information thereof is not assigned. By treating in this way, it is possible to reduce the size of the memory of the ID information storing area, since ID information is not assigned to the alternative area ② and the managing area ③.

In the aforementioned example, the areas, which include the read only area, the write only area, the simultaneous mirroring area, and the time difference mirroring area, are explained. Thus, the effect therefor can be obtained by including at least one of them. Further, it is arbitrary to have a combination of any of the aforementioned respective areas as control information of ID information.

In the aforementioned example, though the memory device 12 is formed by 5 semiconductor memory chips (13, 14, 15, 16, and 17), the number of semiconductor memory chips are not limited thereto. The memory device 12 can be formed by at least 1 semiconductor memory chip.

Though the case, in which the invention is mainly applied to the memory unit formed in the card shape for an application field as a background, is explained, the present invention is not limited thereto but can be applied to various memory units widely.

It is possible to apply the present invention under the condition in which it is possible to rewrite.

The effects obtained by the representatives of the inventions that are disclosed in the present application are described in the following.

That is to say, it is possible to set a limit to accessing the specified memory area in accordance with this control information for accessing from the outside by including control information for setting a limit to accessing the prescribed memory area of plural memory areas in control information.

Further, if the first control information is included in the aforementioned management information, it is possible to prohibit writing data in the prescribed memory area of the aforementioned plural memory areas based thereon and protect data that exist in the aforementioned memory area thereby. If the second control information is included in the aforementioned management information, it is possible to prohibit reading out data from the prescribed memory area of the aforementioned plural memory areas based thereon, and thus it is possible to protect-data that exist in the aforementioned memory area thereby. If the third control information is included in the aforementioned management information 9, it is possible to store data that are written in the prescribed memory area of the aforementioned plural memory areas based thereon in the plural memory areas nearly at the same time, and thus it is possible to avoid losing data by utilizing data from other memory areas. If the fourth control information is included in the aforementioned management information, it is possible to store data that are written in the prescribed memory area of the aforementioned plural memory areas based thereon in the plural memory areas after the prescribed time has passed, and thus it is possible to avoid losing data by utilizing data from other memory areas in the case in which an uncorrectable error is caused. The aforementioned management information can include the fifth control information for identifying whether or not the prescribed memory areas as the spare areas can be used. In this case, the spare area based thereon can be used, and thus the memory capacity is prevented from being reduced by alternating for the spare area.

If sixth control information for indicating erasing number of times or rewriting number of times of the memory area is included in the aforementioned management information, since the span of life of the memory area can be got based thereon, the reliability of the data that are stored in the aforementioned memory area is improved.

If the data processing device is structured by including the aforementioned memory unit and the host unit capable of accessing it, it is possible to include, in the aforementioned host unit, the information processing unit for controlling separately the aforementioned memory area based on aforementioned management information.

Control information is prevented from being unintentionally rewritten by a user by enabling aforementioned management information to be edited at the management information edit step by giving the prescribed command. Further, since the procedural step transits to the management information edit step and edit of control information becomes possible by giving the prescribed command, it is possible to alter the contents of individual control by each area in accordance with the usage of the memory unit.

What is claimed is:

1. A nonvolatile memory device comprising:
    a nonvolatile memory array; and
    a control unit,
    wherein said nonvolatile memory array comprises a user data storing area and a management data storing area,
    wherein said user data storing area comprises a plurality of data blocks,
    wherein said management data storing area stores management information which includes a first flag,
    wherein a multiple data storing function is enabled when said first flag is in a first state, and said multiple data storing function is not enabled when said first flag is in a second state,
    wherein said control unit controls an arbitrary one of operations in accordance with a command received from outside,
    wherein a write operation of said operations in accordance with a write command accompanies program data for storing to a first data block of said data blocks, said control unit selects said first data block, fetches management information corresponding to said first data block, checks whether said first flag is in said first state or not, stores said program data to said first data block, and stores said program data to a second data block different from said first data block when said first flag is in said first state.

2. A nonvolatile memory device according to claim 1,
    wherein said management information has a plurality of entries,
    wherein each of said entries has said first flag in accordance with each of said data blocks, respectively, and
    wherein said first flag is in a first entry in accordance with said first data block.

3. A nonvolatile memory device according to claim 2,
    wherein said write operation in accordance with said write command accompanies a second program data for storing to a third data block, said control unit selects said third data block, fetches a second entry in accordance with said third data block, checks whether said first flag in said second entry is in said first state or not, stores said second program data to said third data block, and does not store said second program data to any other data blocks when said first flag in said second entry is in said second state.

4. A nonvolatile memory device according to claim 3,
    wherein each of said entries further has a second flag,
    wherein a data write inhibiting function is enabled when said second flag is in said first state, and said data write inhibiting function is not enabled when said second flag is in said second state, and
    wherein said write operation in accordance with said write command accompanies third program data for storing to a fourth data block, fetches a third entry in accordance with said fourth data block, checks whether said second flag in said third entry is in said first state or not, and inhibits storing said third program data to said fourth data block when said second flag in said third entry is in said first state.

5. A nonvolatile memory device according to claim 4, wherein both of said second flag in said first entry and said second flag in said second entry are in said second state.

6. A nonvolatile memory device according to claim 5, wherein each of said entries further has a third flag, wherein a data read inhabiting function is enabled when said third flag is in said first state, and said data read inhibiting function is not enabled when said third flag is in said second state, and wherein said third flag in said first entry is capable of being in said first state.

7. A nonvolatile memory device according to claim 6, wherein said read operation of said operations in accordance with a read command for reading data from said first data block, said control unit selects said first data block, fetches said first entry, checks whether said third flag in said first entry is in said first state or not, and inhibits reading said first program data from said first data block when said third flag in said first entry is in said first state, or reading said first program data from said first data block when said third flag in said first entry is in said second state.

8. A nonvolatile memory device according to claim 7, wherein said read operation for reading data from said third data block, said control unit selects said third data block, fetches said second entry, checks whether said third flag in said second entry is in said first state or not, and inhibits reading said second program data from said third data block when said third flag in said second entry is in said first state.

9. A nonvolatile memory device according to claim 8, wherein said read operation for reading data from said fourth data block, said control unit selects said fourth data block, fetches said third entry, checks whether said third flag in said third entry is in said first state or not, and reads stored data from said fourth data block when said third flag in said third entry is in said second state.

* * * * *

UNITED STATES PATENT AND TRADEMARK OFFICE
CERTIFICATE OF CORRECTION

PATENT NO. : 7,117,328 B2
APPLICATION NO. : 10/937258
DATED : October 3, 2006
INVENTOR(S) : Hirofumi Shibuya et al.

It is certified that error appears in the above-identified patent and that said Letters Patent is hereby corrected as shown below:

On the title page, item 73 the Assignee information should read as follows:

(73) Assignees: Renesas Technology Corp; Tokyo (JP);
Hitachi ULSI Systems Co., Ltd., Tokyo (JP)

Signed and Sealed this

Sixth Day of February, 2007

JON W. DUDAS
*Director of the United States Patent and Trademark Office*